United States Patent
Kato et al.

[11] Patent Number: 5,832,215
[45] Date of Patent: Nov. 3, 1998

[54] DATA GATHERING/SCATTERING SYSTEM FOR A PLURALITY OF PROCESSORS IN A PARALLEL COMPUTER

[75] Inventors: Sadayuki Kato, Kawasaki; Hiroaki Ishihata, Tokyo; Takeshi Horie; Satoshi Inano, both of Kawasaki; Toshiyuki Shimizu, Yokohama, all of Japan

[73] Assignee: Fujitsu Limited, Kawasaki, Japan

[21] Appl. No.: 727,932

[22] Filed: Jul. 10, 1991

[30] Foreign Application Priority Data

Jul. 10, 1990 [JP] Japan ................................... 2-182073
Jul. 10, 1990 [JP] Japan ................................... 2-182075

[51] Int. Cl.$^6$ ................................................ G06F 15/163
[52] U.S. Cl. .............................. 395/200.6; 364/229.2; 364/260.2; 364/DIG. 1
[58] Field of Search ............................ 395/800, 325, 395/725, 200, 200.6, 800.01; 370/94.1, 85.6; 364/229.2, 260.2, DIG. 1

[56] References Cited

U.S. PATENT DOCUMENTS

| | | | |
|---|---|---|---|
| 3,611,307 | 10/1971 | Podvin | 395/725 |
| 4,228,496 | 10/1980 | Katzman et al. | 395/200 |
| 4,467,418 | 8/1984 | QuinQuis | 395/325 |
| 4,654,654 | 3/1987 | Butler et al. | 340/825.5 |
| 4,750,114 | 6/1988 | Hirtle | 395/250 |
| 4,888,684 | 12/1989 | Lilja et al. | 395/325 |
| 4,914,653 | 4/1990 | Bishop et al. | 370/85.6 |
| 5,010,477 | 4/1991 | Omoda et al. | 395/800 |
| 5,086,498 | 2/1992 | Tanaka et al. | 395/200 |

Primary Examiner—Alyssa H. Bowler
Assistant Examiner—John E. Harrity
Attorney, Agent, or Firm—Staas & Halsey

[57] ABSTRACT

In a data gathering/scattering system having a data gathering system and a data scattering system in a parallel computer constituted by a plurality of processors connected in parallel through a common bus or hierarchical common buses, the data gathering/scattering system includes: one processor having a buffer for temporarily storing data gathered from or transmitted to other processors, a three-state buffer for transmitting data from the buffer to the common bus, and a switching unit for switching a connection between a transmission and a reception to form the data gathering system or the data scattering system; each of the other processors having a buffer for temporarily storing data to be transferred or data to be received, a transfer control unit for controlling data transmissions from the buffer to the common bus, a reception control unit for selecting the reception data from among all data on the common bus, a three-state buffer for transmitting data from the buffer to the common bus, and a switching unit for switching a connection between a transmission and a reception to form the data gathering system or the data scattering system, and an AND circuit for obtaining a coincidence of a data transmission or data reception among the processors, and for sending a command for a data transmission or data reception to other processors.

13 Claims, 32 Drawing Sheets

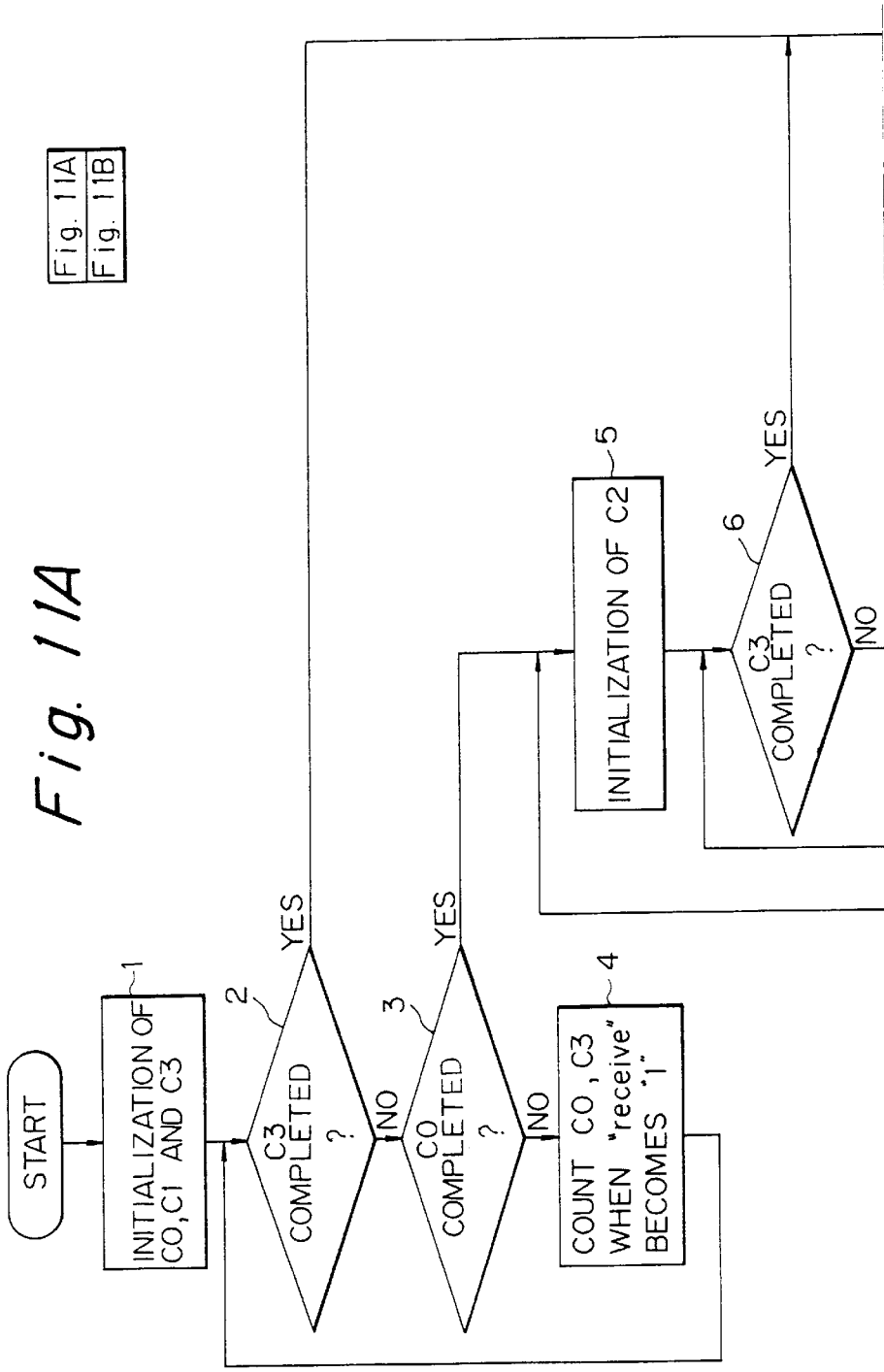

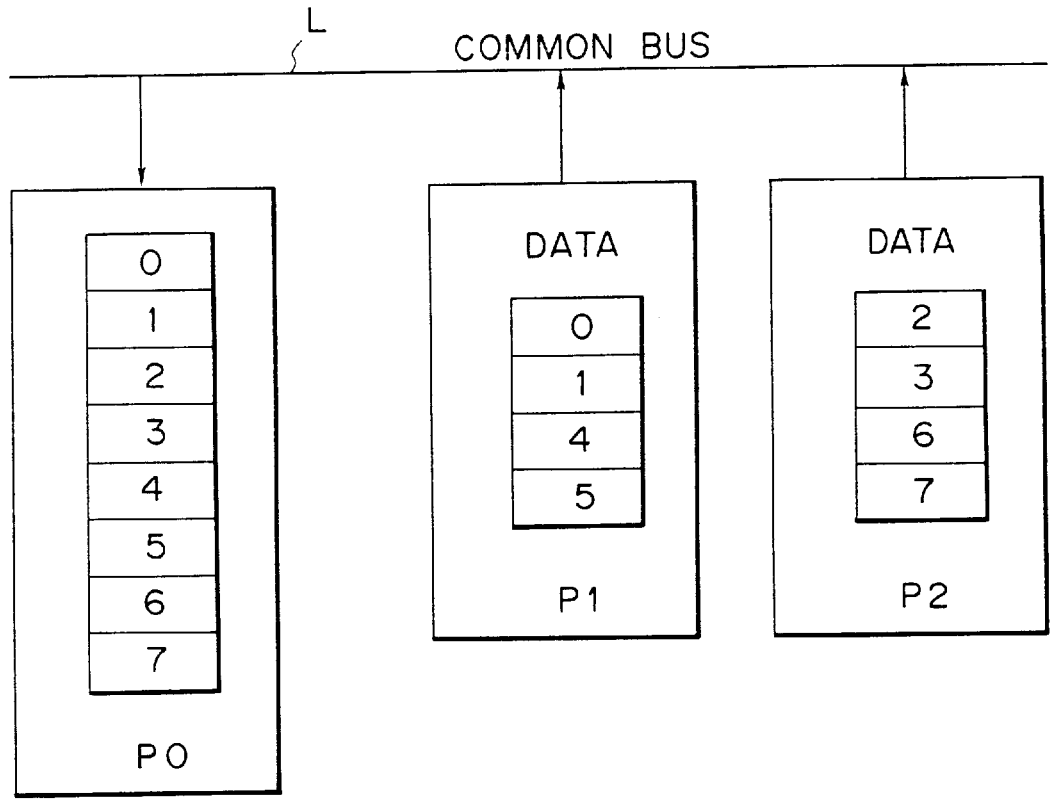

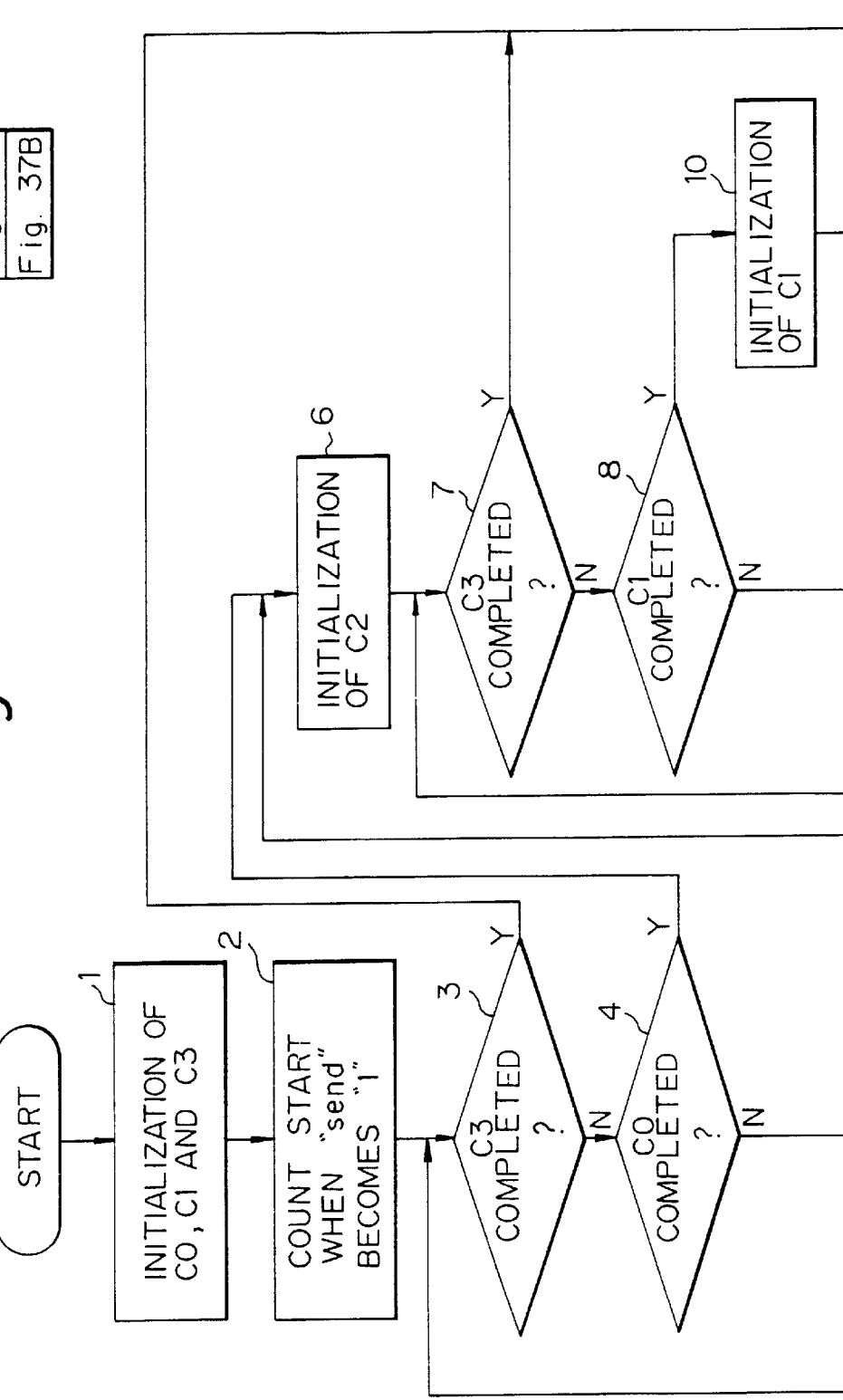

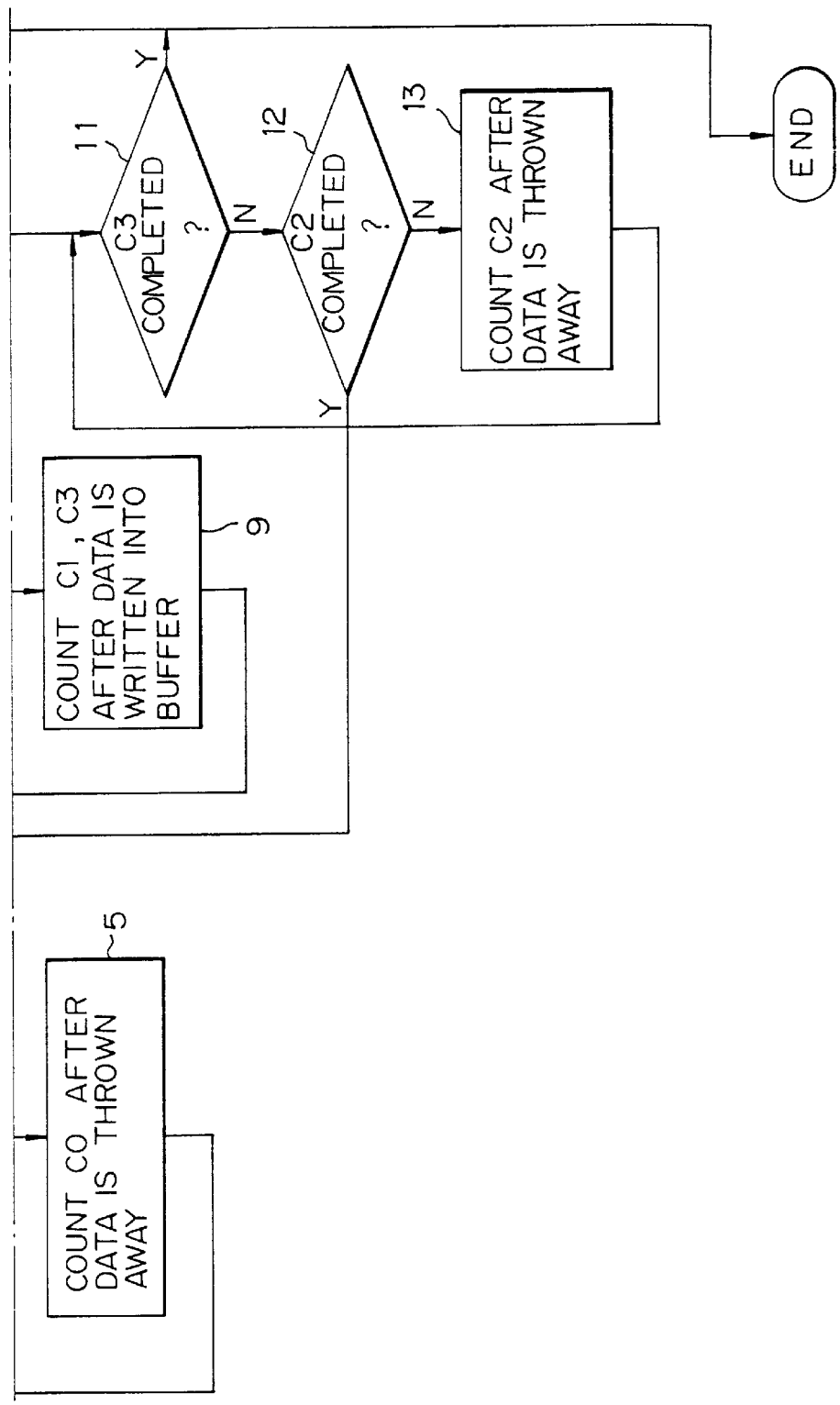

DATA GATHERING/SCATTERING SYSTEM FOR A PLURALITY OF PROCESSORS IN A PARALLEL COMPUTER

BACKGROUND OF THE INVENTION

1. Field of the Invention

The present invention relates to a data gathering/scattering system in a parallel computer constituted by a plurality of processors connected in parallel through a common bus (or hierarchical-type common buses). More particularly, it relates to a data gathering/scattering system which gathers data scattered among many processors to one processor, and which scatters data gathered in one processor to other processors. Accordingly, in one aspect, the present invention relates to a data gathering system, and in another aspect, the present invention relates to a data scattering system.

2. Description of the Related Art

A parallel computer is now used in a high speed data processing system, because it has a relatively simple structure and enables a high speed data processing, and thus makes it possible to realize a relatively low cost and high performance computer system. In general, the parallel computer is constituted by a plurality of processors, each having the same structure and performance and connected in parallel through a common bus (or hierarchical-type common buses). Accordingly, an effective gathering of data from other processors at one processor and an effective scattering of data from one processor to other processors become very important, and these features must be possessed by the parallel computer to enable a high speed processing.

Accordingly, it is necessary to improve the methods of gathering and scattering data among processors. In the present invention, it is possible to realize a high speed gathering of data scattered among many processors to one processor, and to realize a high speed scattering of data from one processor to other processors.

SUMMARY OF THE INVENTION

The object of the present invention is to provide a data gathering/scattering system having a data gathering system and a data scattering system, by which a high speed gathering of data scattered in many processors to one processors, and a high speed scattering of data of one processor to other processor can be attained.

In accordance with the one aspect of the present invention, there is provided a data gathering system in a parallel computer constituted by a plurality of processors connected in parallel through a common bus, wherein one of the processors has a reception buffer for temporarily storing data gathered from other processors; each of the other processors has a transmission buffer for temporarily storing data to be transferred, and a transfer control unit for controlling data transmission from the transmission buffer to the common bus by checking a number of data on the common bus and determining an order of transfer of its own processor; and an AND circuit receives ready signals from all processors and outputting a reception signal to all processors.

As an embodiment of the above invention, there is provided a data gathering system comprising: one of the processor having a reception buffer for temporarily storing data gathered from other processors; a plurality of mediating units each connected to a hierarchical common bus, for determining a direction of transfer of the data; and each of the other processors having a transmission buffer for temporarily storing data to be transferred, and a transfer control unit for controlling a data transfer from the transmission buffer to the common bus by checking a number of data on the common bus and determining an order of transfer of its own processor.

In a preferred embodiment, the order of the transfer is stored in a memory of the processor gathering data, and the transfer control unit intermittently transfers data in accordance with the order of transfer stored in the memory.

In a preferred embodiment, the data gathering system further comprises a collision preventing unit connected to the common bus or the hierarchical common buses for preventing collision which occurs when a plurality of processors simultaneously transmit data on the common bus or busses; the transfer control unit transmitting a transfer request signal to the collision preventing unit before the processors transmit the data, whereby the collision preventing unit detects the competition among the transfer request signals and controls the order of transfer from the processors.

In a preferred embodiment, the transfer control unit outputs a hand-shake signal to other processors, when its own processor is in not the order of the transfer, and its own processor transmits the data to the common bus after an AND operation among all hand-shake signals.

In a preferred embodiment, the transfer control unit includes a sequencer and four count control circuits each connected to the sequencer, each count control circuit having a counter for counting a numbers of words and a register for prestoring numbers of words to be counted.

In accordance with another aspect of the present invention, there is provided a data scattering system in a parallel computer constituted by a plurality of processors connected in parallel through hierarchical-type common buses, wherein one of the processors has a transmission buffer for temporarily storing data to be transferred to other processors, and for sequentially transmitting all data to the common bus by a broadcasting method; each of the other processor has a reception buffer for temporarily storing data to be received, and a reception control means for selecting the data to be receives from all data on the common bus in accordance with a predetermined reception count and an AND circuit receives ready signals from all reception processors and outputting a send signal from transmission processors to reception processors prior to the data transmission.

In a preferred embodiment, the reception control unit is constituted by hardware, and the reception control unit includes a sequencer and four count control circuits each connected to the sequencer, each count control circuit having a counter for counting numbers of words and a register for prestoring numbers of words to be counted.

In accordance with still another aspect of the present invention, there is provided a data gathering/scattering system having a data gathering system and a data scattering system in a parallel computer constituted by a plurality of processors connected in parallel through a common bus or hierarchical common buses, wherein one of the processors has a buffer for temporarily storing data gathered from or transmitted to other processors, a three-state buffer for transmitting data from the buffer to the common bus, and a switching unit for switching a connection between a transmission and a reception to form the data gathering system or the data scattering system; each of the other processors having a buffer for temporarily storing data to be transferred or data to be received, a transfer control unit for controlling data transmissions from the buffer to the common bus, a reception control unit for selecting the reception data from among all data on the common bus, a three-state buffer for transmitting data from the buffer to the common bus, and a switching unit for switching a connection between a transmission and a reception to form the data gathering system or the data scattering system; and an AND unit for obtaining a coincidence of a data transmission or a data reception among the processors and for sending a command for a data transmission or a data reception to other processors.

BRIEF DESCRIPTION OF THE DRAWINGS

In the drawings:

FIGS. 11A and 11B are a flowchart explaining an operation of a sequencer shown in FIG. 7;

FIGS. 13 and 14 are view explaining data gathering according one embodiment of the present invention;

FIGS. 37A and 37B are a flowchart explaining an operation of the sequencer;

DESCRIPTION OF THE PREFERRED EMBODIMENTS

Before describing the preferred embodiments, an explanation is given of the problems found in a conventional data gathering method in a parallel computer.

Figure 1:
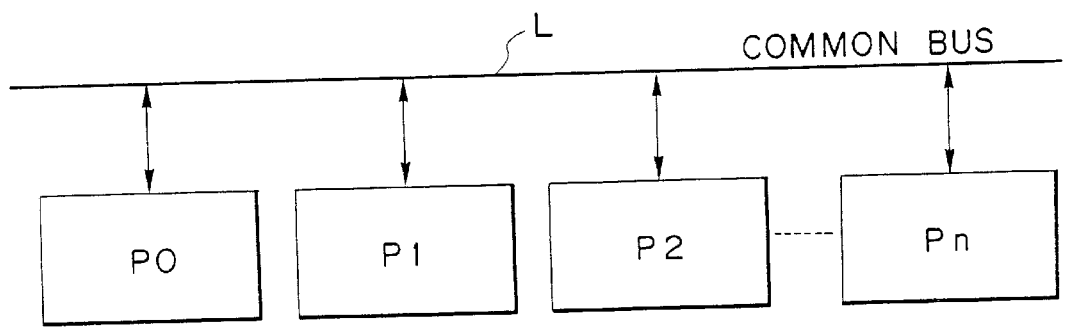
FIG. 1 (PRIOR ART) is a schematic block diagram of a parallel computer.

FIG. 1 (PRIOR ART) is a schematic block diagram of a parallel computer. In FIG. 1, a plurality of processors P1 to Pn are connected in parallel through a common bus L, whereby data can be transferred and received between processors. In the parallel computer, data to be processed is divided into each processor in accordance with the number of the processor, and each processor then performs an assigned data processing.

After the processing operation, for example, a calculation, is completed in the processor, the resultant data at the processor is gathered at one processor (below, specified processor), and the gathered data is arranged in order in the specified processor as the data to be processed.

Figure 2:
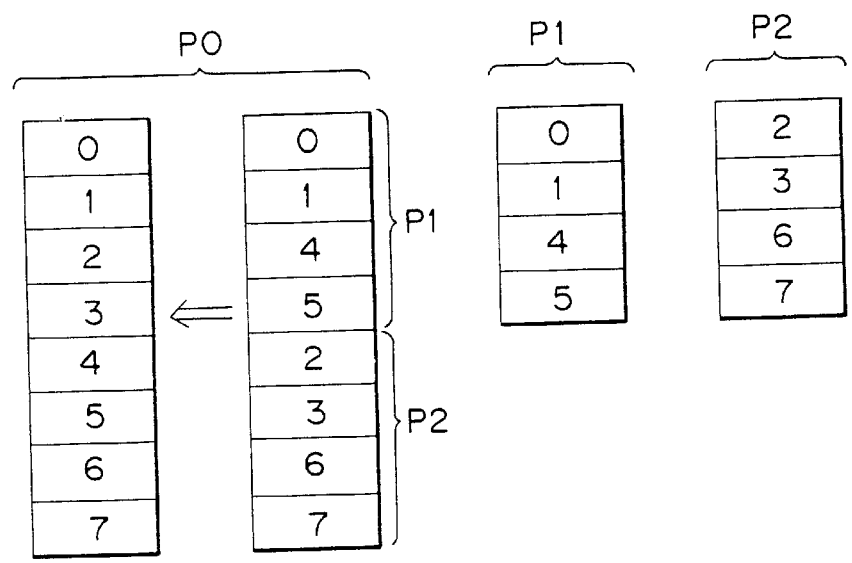
FIG. 2 (PRIOR ART) is a view for explaining data processing in each processor shown in FIG. 1.

FIG. 2 (PRIOR ART) is a view explaining the data processing in each processor shown in FIG. 1. In these processors, data 0 to 7 to be processed are scattered to the processors P1 and P2, and the resultant data at each processor are gathered into the processor P0. Among this data, assuming that processing time of data 0 to 3 is longer than that of data 4 to 7, the processor P1 handles data 0, 1, 4 and 5, and the processor P2 handles data 2, 3, 6 and 7, to obtain a uniform processing time at each processor. The data is gathered in the processor P0 for each processor P1 and P2, to realize a high speed transmission, and after the data is received, the data is arranged therein in order from data 0 to data 7.

As mentioned above, each processor is connected in parallel through the common bus, to perform a transmission/reception of data between processors. In this case, it is necessary to control the transmission of data on the common bus L so that the data is not simultaneously transmitted from more than two processors. Accordingly, a mediating means is provided in the parallel computer to perform that control, and this mediating means decides the order of transmission of data for each processor.

In the conventional steps, first each processor transmits a signal requesting a transmission of data, to the mediating means, the mediating means then sends the order of transmission to each processor after mediating all requests from the processors, and finally, the processor sends the data to the common bus L.

In the conventional art explained above, since all data scattering among many processors are gathered at one processor, a long response time is necessary between the processors when deciding all of the orders in which the processors will transmit data. Further, a long data transferring time is necessary between processors after all of the orders of the processors are decided. Accordingly, a long response time and a long transfer time (a sum of these times is called the processing time) are necessary for gathering and scattering data between processors. Further, a long time is necessary for arranging the data in order in the specified processor, for example, the processor P0. Namely, the more data to be processed, the longer the arrangement time. Accordingly, in the conventional parallel computer, the greater the number of processors, the longer the data processing and arrangement time.

Accordingly, the object of the present invention is to provide a data gathering/scattering system which will enable a high speed gathering of data scattered among many processors, to one processor, and will enable a high speed scattering of data in one processor to other processors.

A data gathering/scattering system according to the present invention is explained in detail hereinafter.

Figure 3:
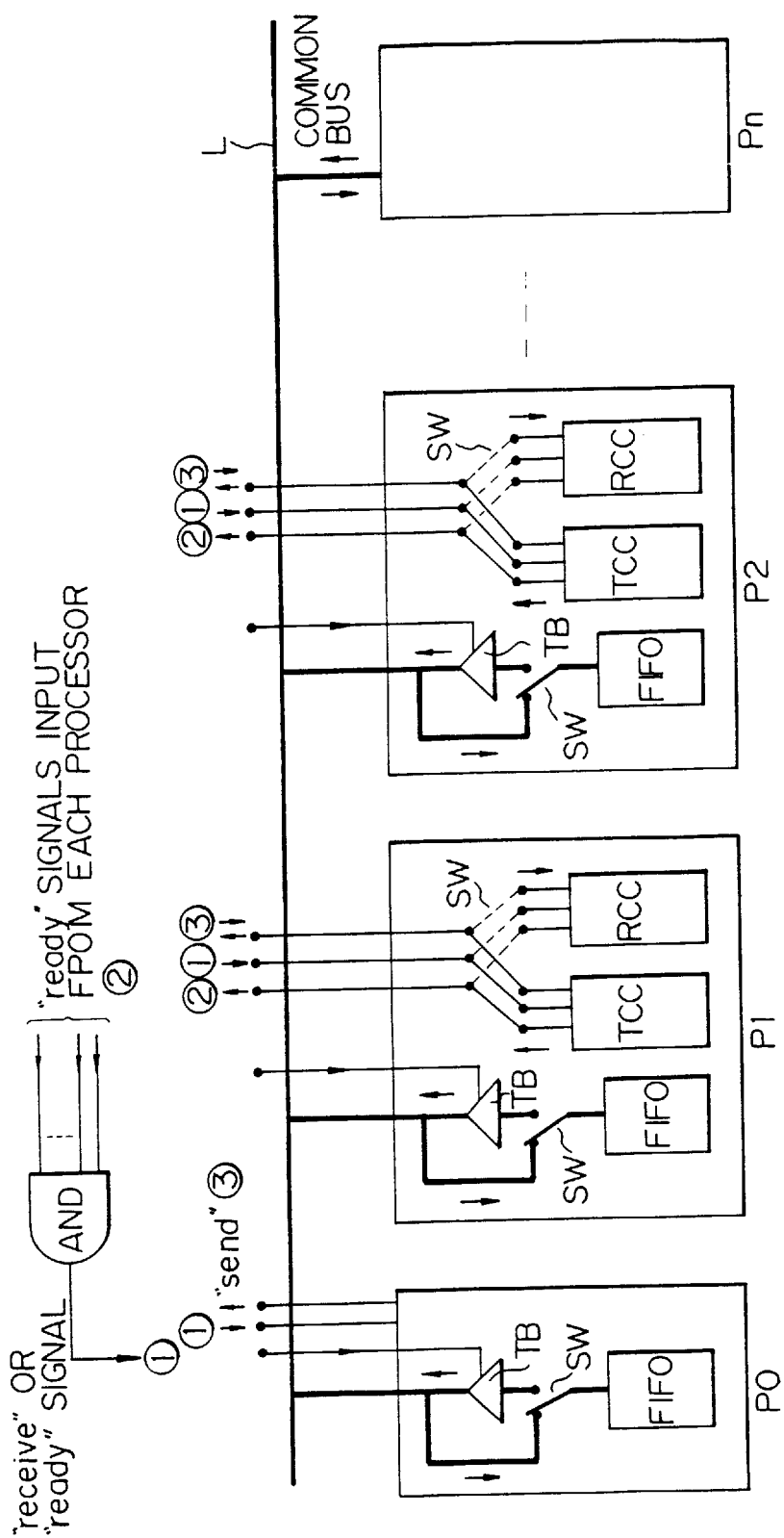
FIG. 3 is a basic block diagram or a data gathering/scattering system according to the present invention.

FIG. 3 is a basic block diagram of a data gathering/scattering system according to the present invention. This data gathering/scattering system is constituted by a data gathering system and a data scattering system as explained in detailed below. As shown in this drawing, as one example, a plurality of processors are connected in parallel through a common bus L, a processor P0 is fixedly provided for gathering data or transmitting data, and other processors P1 to Pn are provided for transmitting data or receiving data. Each processor has a FIFO buffer for temporarily storing data to be received or data to be transmitted; except the processor P0, which has only a FIFO buffer, each of the other processors also has a transfer control circuit TCC and a reception control circuit RCC.

A switching means is provided for switching a connection between a data gathering system and a data scattering system. When this system is used as the data gathering system, the data is gathered from other processors P1 to Pn at the processor P0, and when this system is used as the data scattering system, the data is transmitted from the processor P0 to the other processors P1 to Pn. Accordingly, a three-state buffer TB is provided, for transmitting the data from the FIFO buffer, in each processor. In this case, a switching command to the switching means is generated from the processor P0 to other processors P1 to Pn.

Further, this system is provided with an AND circuit for obtaining a coincidence of a data transfer or data reception among processors, and for sending a command for a data transfer or data reception to the processor after the AND operation. In this case, the output of the AND circuit has a different function when sent to the data gathering system and when sent to the data scattering system, as explained in detail below.

A data gathering/scattering system can be constituted by hierarchical type common buses instead of the above flat type common bus, and can be provided with a collision preventing means for preventing a collision of data on the bus. Further, in the hierarchical bus structure, it is possible to switch the direction of a data transfer from an upper bus to a lower bus, or vice versa. Note, these structures are not explained in detail in the data gathering system and the data scattering system, to simplify the description.

As one aspect of the present invention, a data gathering system is explained in detail below.

Figure 4:
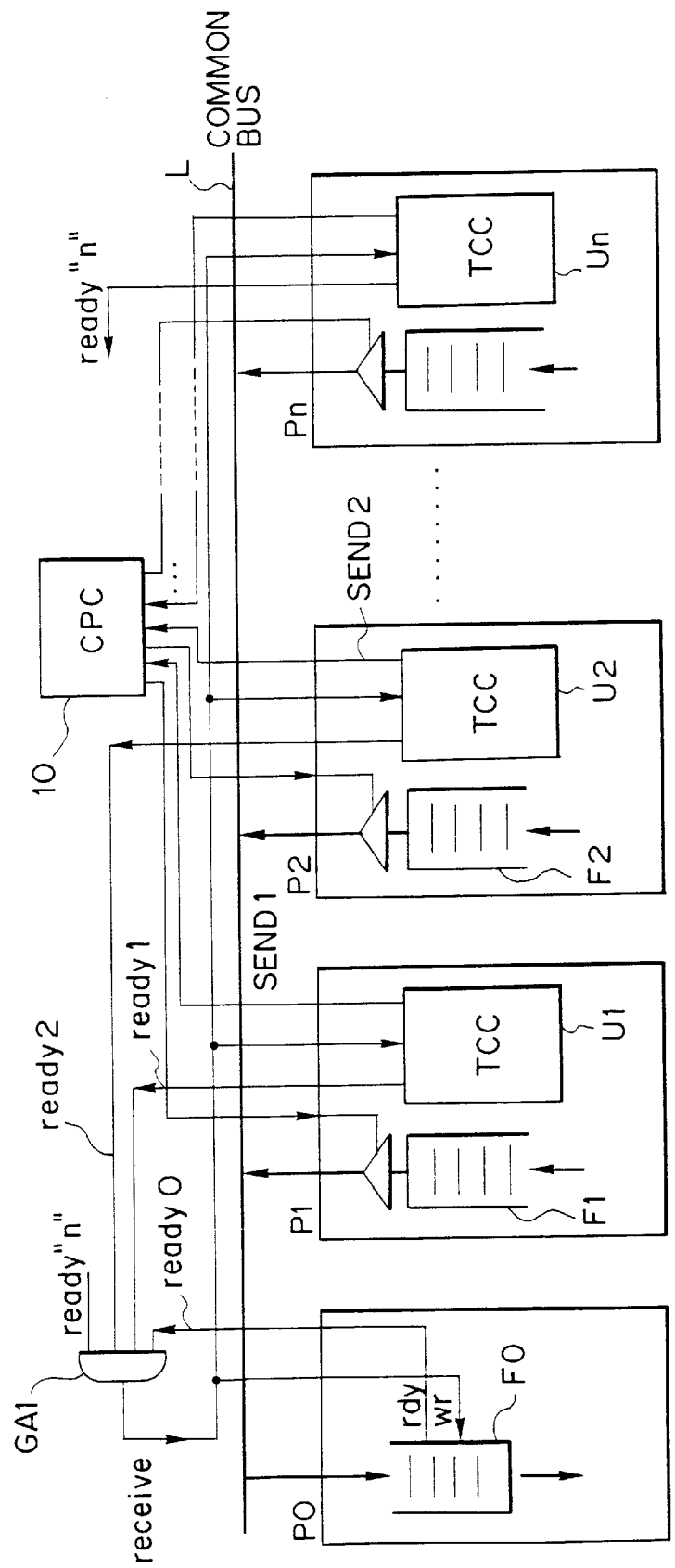
FIG. 4 is a schematic block diagram of a data gathering system constituted by a flat type common bus according to the present invention.
Figure 5:
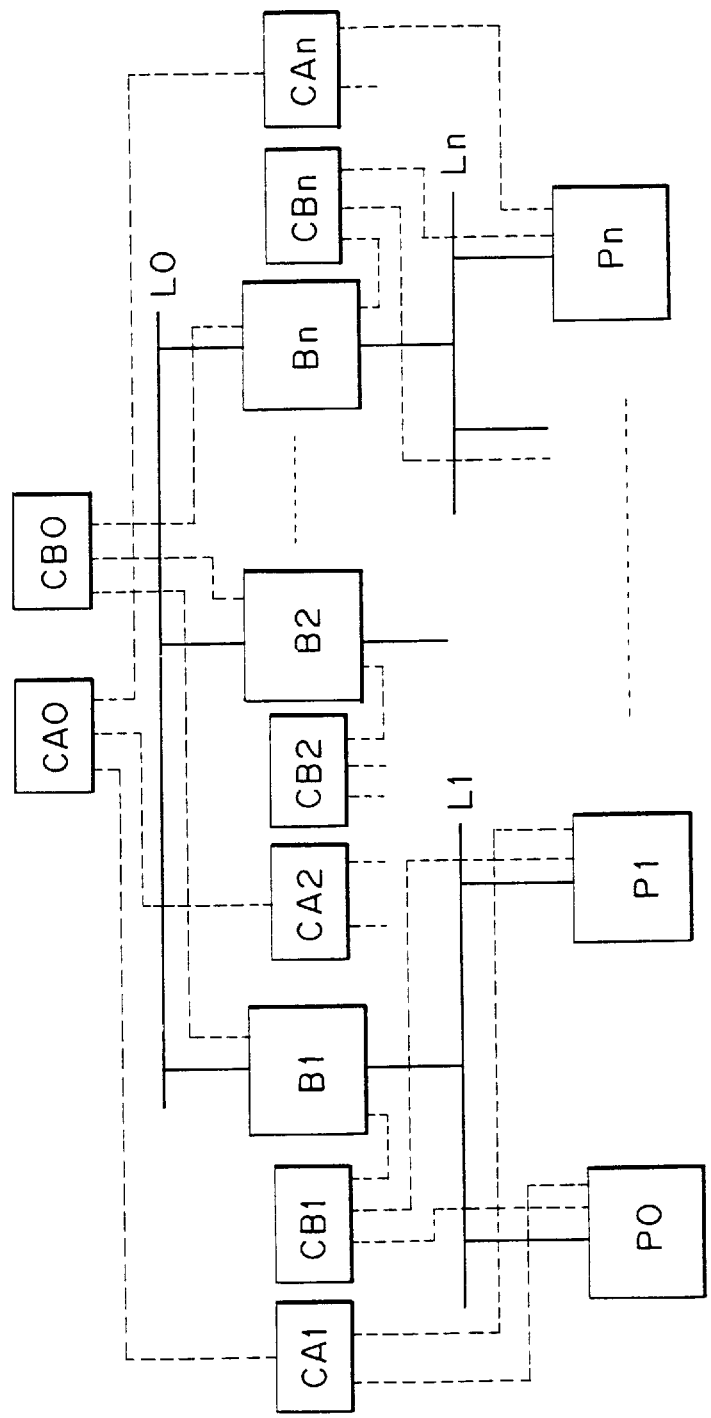
FIG. 5 is a schematic block diagram of a data gathering system constituted by a hierarchical common buses according to the present invention.

FIG. 4 is a schematic block diagram of a data gathering system constituted by a flat type common bus, and FIG. 5 is a schematic block diagram of a data gathering system constituted by hierarchical type common buses. In FIG. 4, only transfer control circuits (TCC) are shown in each processor, to simplify the explanation. In FIGS. 4 and 5, P0, P1, P2, . . . , Pn denote processors, L, L0, L1, . . . , Ln denote common buses, and U1, U2, . . . , Un denote transfer control circuits. F0 denotes a reception buffer constituted by a FIFO (First-In First-Out), and F1, F2, . . . , Fn denote transmission buffers each also constituted by the FIFO. Reference number 10 denotes a collision preventing circuit (CPC), and GA1 denotes an AND circuit or performing a hand-shake operation among transfer control circuits. In FIG. 5, CA0 to CAn denote first mediating circuits, and CB0 to CBn denote second mediating circuits; these circuits have a collision preventing function. Further, B1 to Bn denote buffers for relaying a transmission/reception of data. In this embodiment, P0 is a reception processor for gathering data, and P1 to Pn are transmission processors for outputting data.

In FIG. 4, the processor P0 gathers data from the processors P1 to Pn, and accordingly, the processors P1 and P2 transmit data to the processor P0. Each transmission processor P1 and P2 is provided with a transfer control circuit U1 and U2 for determining the order of output from the transmission processor. The transfer control circuit U1 and U2 checks the number of transfer data on the common bus L in accordance with a predetermined transfer schedule, and waits for an output from its own processor in accordance with the predetermined order.

In FIG. 5, this structure has a hierarchical common bus structure constituted by buses L0, L1, . . . , Ln. As shown in the drawing, the bus L0 connects the buffers B1 to Bn, in parallel, the bus L1 connects the processors P0 and P1 in parallel, and the bus Ln connects the other processors Pn in parallel. The bus L0 is connected to the bus L1 through the buffer B1, and is connected to the bus Ln through the buffer Bn. In this case, it is possible to provide another hierarchical bus structure in accordance with desired structure of the parallel computer.

The first mediating circuits CA0 to CAn are provided in accordance with the hierarchical structure of the bus, and control the buffers B1 to Bn to determine the direction of a data transfer on the bus.

The second mediating circuits CB0 to CBn are also provided in accordance with the hierarchical structure of the bus, and control an ON/OFF of the outputs from the buffers B1 to Bn and the processors P0 to Pn. Further, the second mediating circuits CB0 to CBn perform a control for preventing collisions on the common bus.

As shown in FIG. 4, each of the transfer control circuits U1 to Un outputs a signal "ready 0" indicating a completion of a preparation of the reception, and a signal "ready 1" indicating a transmission of data for each data transfer unit. The AND gate GA1 receives these ready signals "ready 0" to "ready 2", and outputs a signal "receive" to the processors P0 and the transfer control circuits U1 and Un, to maintain a synchronous operation among these transfer control circuits.

Further, the transfer control circuit outputs a "handshake" signal (for example, "receive" signals) to other transfer control circuits based on the "ready" and "receive" signals. Namely, when the hand-shake signal is accepted among the transfer control circuits, the transmission processor having the corresponding transfer control circuit can output the data on the common bus. In the present invention, it is possible to predetermine the order of the output from the transmission processor based on the hand-shake operation among the transfer control circuits, and the order of output is prestored in the reception processor P0.

The collision preventing circuit 10 and the second mediating circuit CB0 to CBn function to prevent collisions and to mediate the order of output on the common bus. Namely, a collision of the data on the common bus occurs when a plurality of processors simultaneously output data on the common bus, and in general, this collision is caused by a incorrect setting of the order of output. Accordingly, to avoid a collision of the data on the common bus, the mediating circuit previously checks request signals from the transfer control circuits U1 to Un and the first mediating circuit CA0 to CAn, and controls the output of the data from the processors accordingly.

Figure 6:
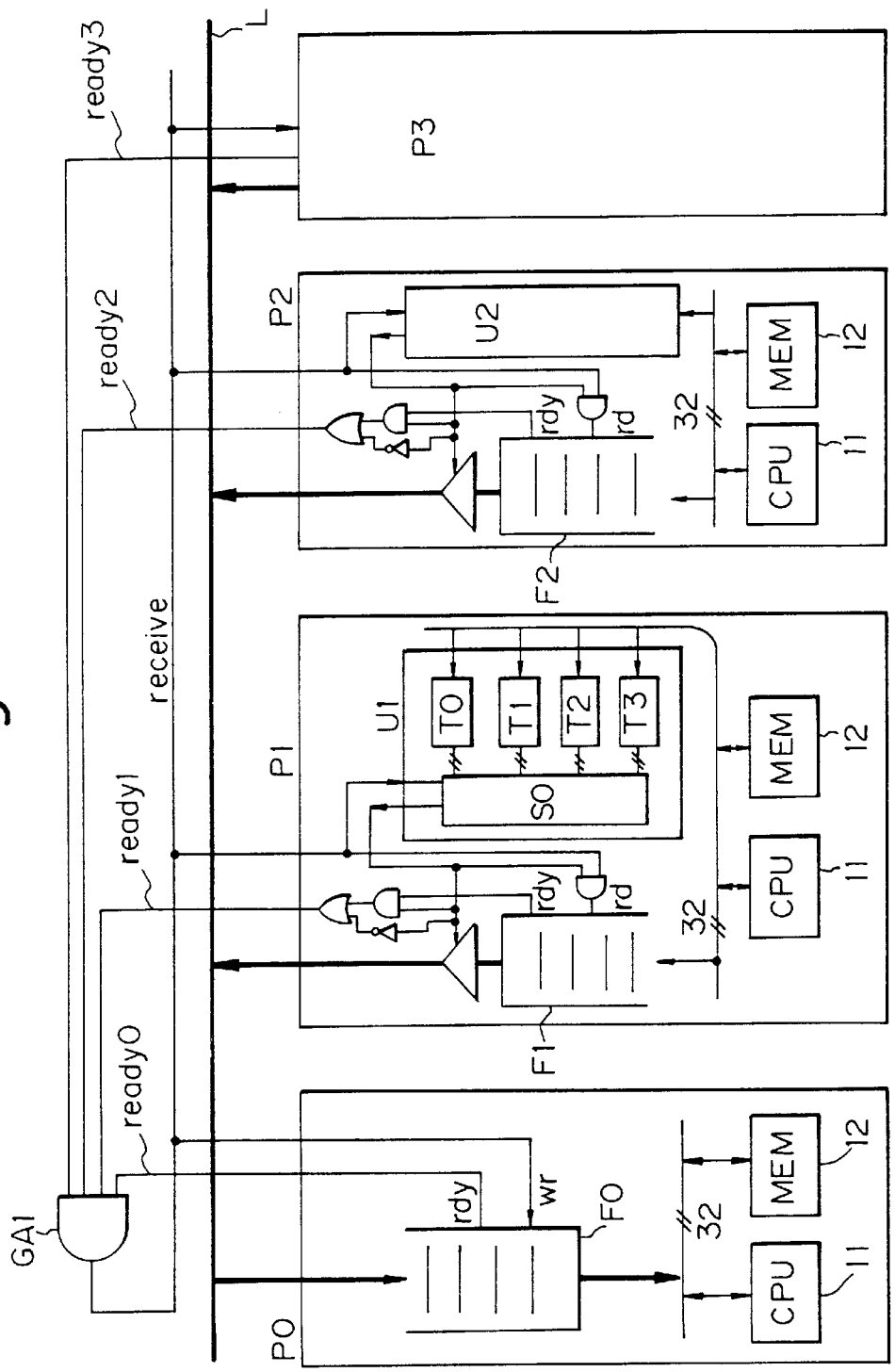
FIG. 6 is a schematic block diagram of a data gathering system constituted by a flat type common bus shown in FIG. 4.

FIG. 6 is a schematic block diagram of one example of a data gathering system constituted by a flat type common bus. In FIG. 6, P0 denotes the reception processor for gathering data, and P1 to P3 denote the transmission processors for transmitting data. All of the transmission processors P1 to P3 the have same structure. F0 denotes the reception buffer for temporarily storing data, and F1 to F3 denote the transmission buffers for temporarily storing data. These buffers are constituted by FIFO buffers. Further, U1 and U2 denote the transfer control circuits, S0 denotes a sequencer, T0 to T3 denote counter control circuits, 11 denotes a central processing unit (CPU), 12 denotes a memory (MEM), and GA1 denotes the AND gate.

Figure 7:
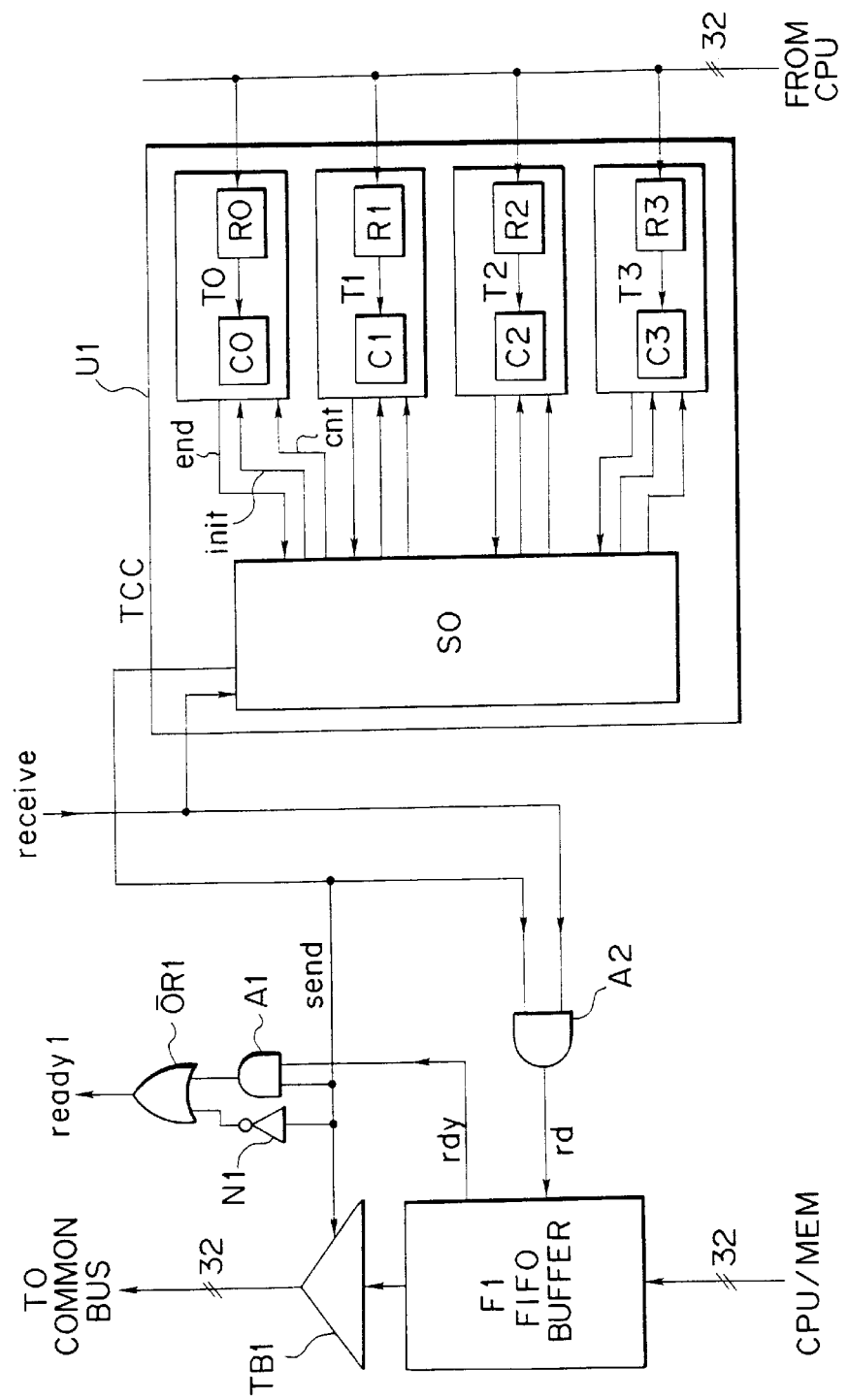
FIG. 7 is a detailed circuit diagram of one example of a transmission processor shown in FIG. 6.

FIGS. 7 is a detailed circuit diagram of one example of the transmission processor shown in FIG. 6. In FIG. 7 C0 to C3 denote counters, R0 to R3 denote registers for setting parameters, A1 to A2 denote AND gates, N1 denotes a NOT gate, OR1 denotes an OR gate, and TB1 denotes a three-state buffer. Each counter and register are included in the counter control circuit. An explanation of the collision preventing circuit, is given in FIG. 12.

In FIGS. 6 and 7, the data to be transferred (the transmission data) is prestored in the transmission buffers F1 to F2, under the control of the CPU or a DMA circuit (not shown) connected to an internal bus, and transmitted to the common bus L in response to a "send" command from the transfer control circuit. The counter control circuits T0 to T3 prestore the transfer schedules of data prepared by the CPU 11, and the sequencer S0 checks the data transfer on the common bus L in accordance with the hand-shake signal "receive", and controls the operation of the counter control circuits T0 to T3 to thereby transmit the data.

The signal "rdy" from the buffer F1 is "1" or "0". Namely, when the signal is "1", a vacant area exists in the buffer F1, and when the signal is "0", there is no vacant area in the buffer F1. Further, the data transferred from the transmission processors can be written to the reception buffer F0 when he signal "wr" is "1".

In the transmission buffer, when the signal "rdy" is "1", data exists in the transmission buffer, and when the signal "rdy" is "0", there is no data in the transmission buffer. When the read signal "rd" is "1", the data is output from the transmission buffer F1.

When all ready signals 0 to 3 are "1", it is possible to transfer the data from the transmission processors. The "ready" signal is set "1" when the transmission processor outputs the data, and at that time, the "ready" signals of other processors, which are not transmitting data, are set to "1" regardless of the existence or non-existence of data therein. Accordingly, the gate GA1 can output the "receive" signal (or "wr" signal) to all of the processors P0 to P3. For example, in FIG. 3, the three-state buffer TB1 is opened by the "send" signal when data exists in its own buffer F1, and the data is output to the common bus L. After the data is transmitted from the buffer F1 to the common bus L, the "ready" signal for a hand-shake is set to "1". The processor P0 receives the data in response to the "receive" signal, and each of the transmission processors P1 to P3 counts the number of data transferred to the reception processor P0.

Figure 8:
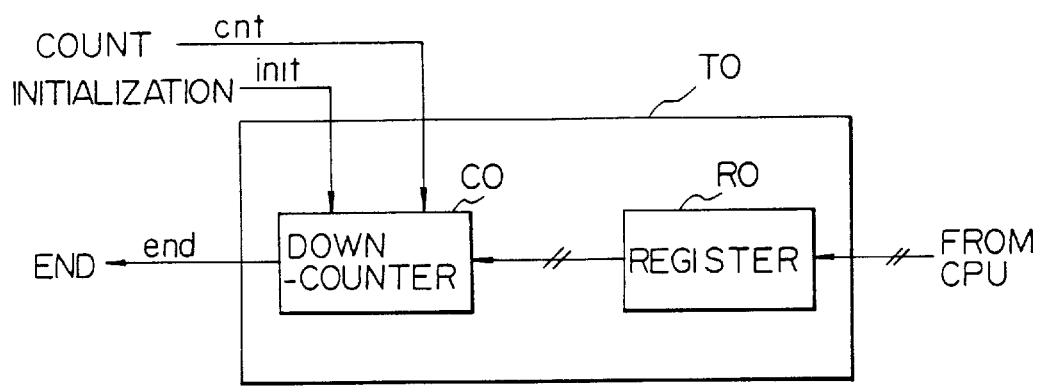
FIGS. 8 and 9 are detailed circuit diagrams for counter control circuits shown in FIG. 7.
Figure 9:
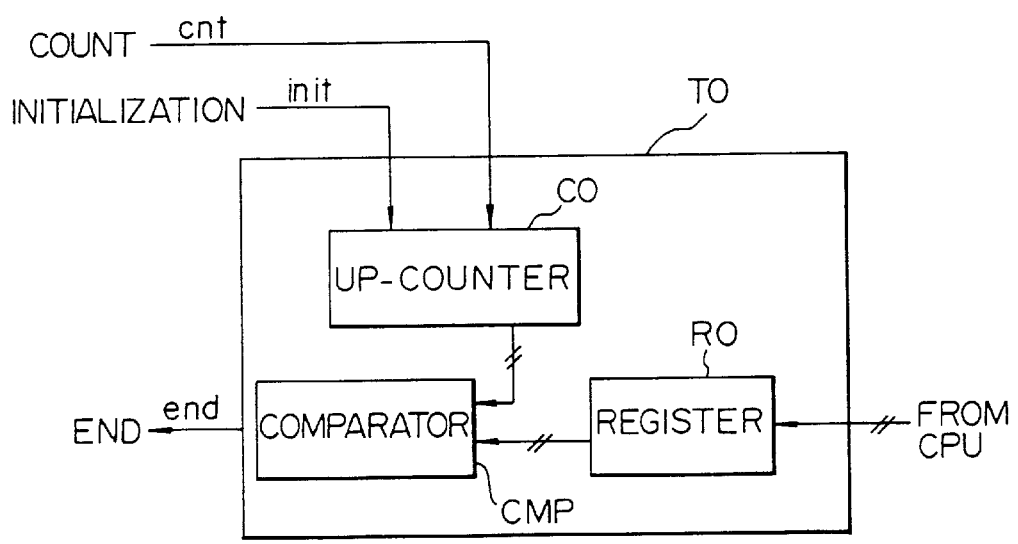

FIGS. 8 and 9 are detailed circuit diagrams of counter control circuits shown in FIG. 7, wherein FIG. 8 shows a down-counter and FIG. 9 shows an up-counter. In FIG. 8, in the down-counter C0, when the count control signal "cnt" is "1", the value of the counter C0 is continuously decremented by one. The register R0 stores an initial value, and the initial value is loaded in the counter C0 in response to an initial signal "init". The "cnt" and "init" signals are input from the sequencer S0 to the counter C0, and when the counter reaches the value "0", the counter C0 outputs an end signal "end" to the sequencer S0.

In FIG. 9, the counter C0 is cleared by the initial signal "init", and the value of the counter C0 is continuously incremented by one in response to the count control signal "cnt". A comparator CMP is provided for comparing the value of the counter C0 with the content of the register R0, and when the value of the counter C0 coincides with the content of the register R0, the comparator CMP outputs the end signal "end" to the sequencer S0. In FIG. 3, the following parameters are set into the registers R0 to R3; i.e., various numbers of words are set to each of the registers R0 to R3.

The numbers of words waiting until the processor P1 can initially transmit data, are set to the register R0.

The numbers of words sequentially transmitting the data from the processor P1, after waiting for the number of words at the register R0, are set to the register R1.

The number of words waiting until the processor P1 can again transmit data, after a transmission of data based on the numbers of words at the register R1, are set thereto the register R2.

The total numbers of words transmitted from all of the transmission processors are set to the register R3.

Figure 10:
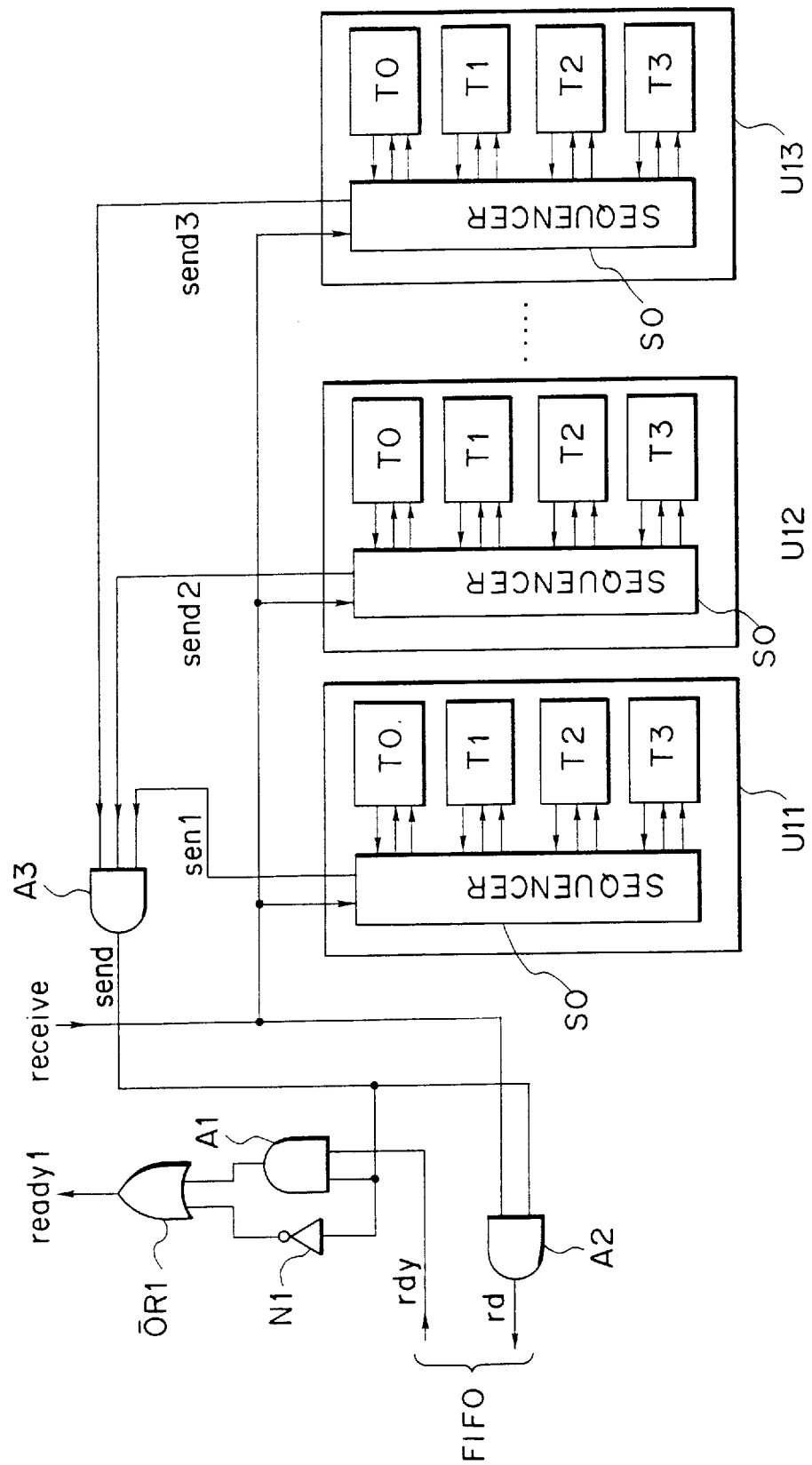
FIG. 10 is detailed circuit diagram of another example of the transmission processor shown in FIG. 6.

FIG. 10 is a detailed circuit diagram of another example of the transmission processor shown in FIG. 6. In FIG. 10, an AND gate A3 is provided to the sequencers S0. The signals "send", "send 1" and "send 3" indicate the transfer requests from the transfer control circuits U11 to U13. When all signals "send 1", send 2" and "send 3" are "1", the output "send" from the AND gate A3 is made "1" and the actual transfer request is transmitted to the AND gates A1 and A2.

Briefly, the sequencer S0 operates as follows. First, the counter C0 starts to count the number of data in response to the "receive" signal, and when the counting operation is completed, the counter outputs an "end" signal to the sequencer S0. Then, the sequencer S0 transmits the "send" signal to the transmission buffer F1, and at the same time, the counter C1 starts to count the number of data, and the transmission buffer F1 outputs the data until the counting operation is completed. Finally, when the counting operation of the counter C1 is completed, the data transfer from the buffer F1 is stopped and the counter C2 starts to count the number of data. When the counting operation is completed, the counter C1 is initialized and the data transfer is again started, the counter C3 continues to count the number of data, and when the counting operation is completed, the data transfer operation for the buffer F1 is completed.

Figure 11B:
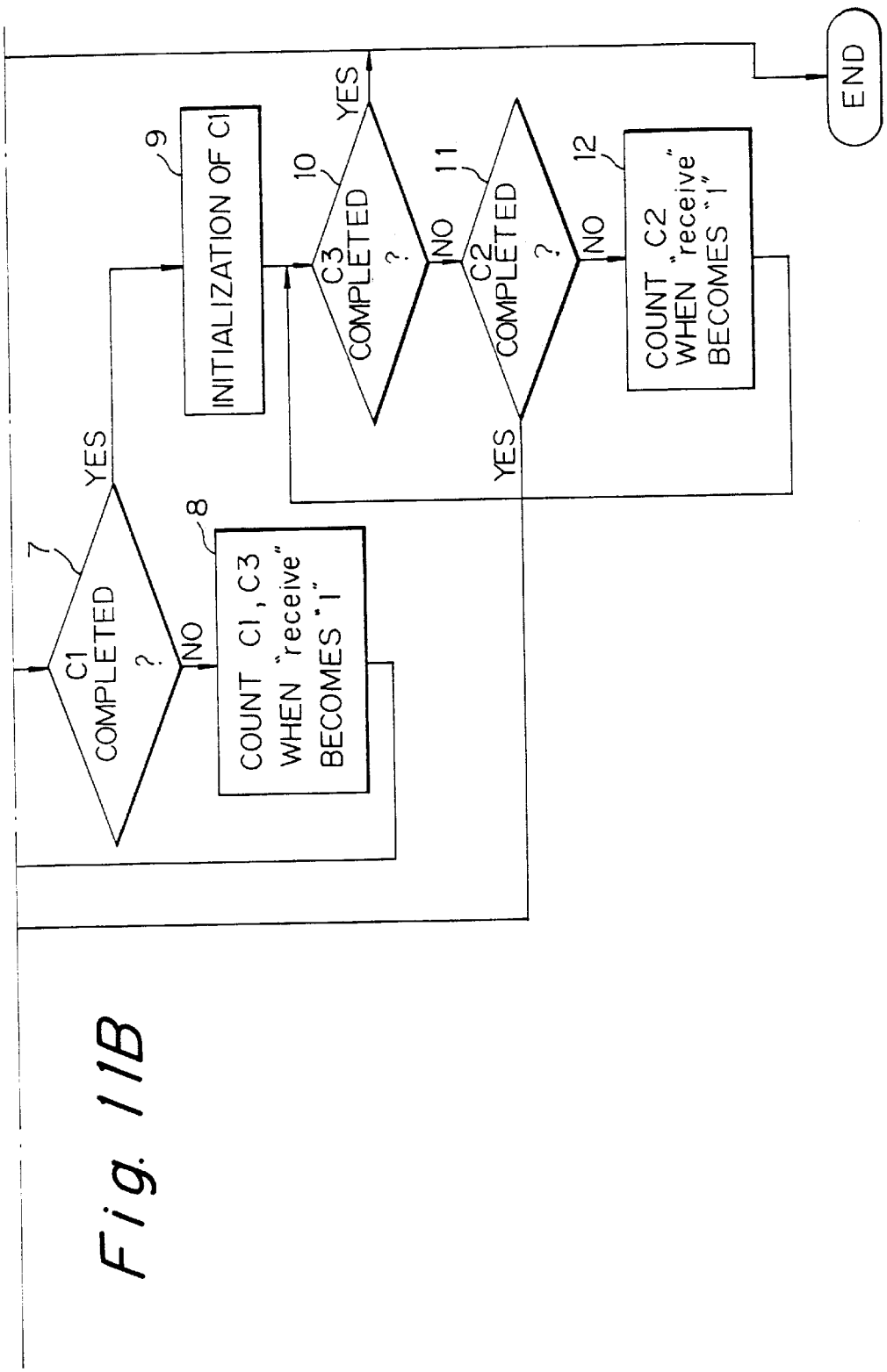

FIGS. 11A and 11B are a flowchart explaining the operation of the sequencer shown in FIGS. 7 and 10. First, the counters C0, C1 and C3 are initialized (step 1), and then the sequencer S0 determines whether or not the counting operation of the counter C3 is completed (step 2). When the result is "YES", the data transfer operation is completed, and when the result is "NO", the sequencer S0 determines whether or not the counting operation of the counter C0 is completed (step 3). When a "NO" result is obtained, the counting operation of the counters C0 and C3 is started when the "receive" signal is "1" (step 4) and the routine returns to step 2. When a "YES" result is obtained in step 3, i.e., when the counting operation of the counter C0 is completed, the counter C2 is initialized (step 5).

Again, the sequencer S0 determines whether or not the counting operation of the counter C3 is completed (step 6). When the result is "YES", the data transfer operation is completed, and when "NO", the sequencer S0 determines whether or not the counting operation of the counter C1 is completed (step 7). When the result is "NO", the data is transferred from the buffer F1 by opening the three-state buffer TB1, and further, the counting operation of the counters C1 and C3 is started when the "receive" signal is "1" (step 8), and the routine returns to step 6. When the result is "YES" at step 7, i.e., when the counting operation of the counter C1 is completed, the counter C1 is initialized (step 9).

Further, the sequencer S0 determines whether or not the counting operation of the counter C3 is completed (step 10). When the result is "YES", the data transfer operation is completed, and when "NO", the sequencer S0 determines whether or not the counting operation of the counter C2 is completed (step 11). When the result is "NO", the counting operation of the counters C2 and C3 is started when the "receive" signal is "1" (step 12) and the routine returns to step 10. When the result is "YES" in step 11, i.e., when the counting operation of the counter C2 is completed, the counter C2 is initialized (step 5).

In the above control procedures, the sequencer S0 sets the "send" signal for the transfer request to "1" during the counting operation of the counter C1. When the "send" signal is "1", the data is transferred from the transmission buffer F1 through the three-state buffer TB1, and when the "send" signal is "0", the "ready 1" signal is set to "1" and another processor is allowed to transmit data to the reception processor.

The following explanation is given of the collision preventing circuit. This circuit is provided for preventing a collision of data on the common bus L. This collision is caused mainly by an incorrect setting of the order of output from the transmission processors.

Figure 12:
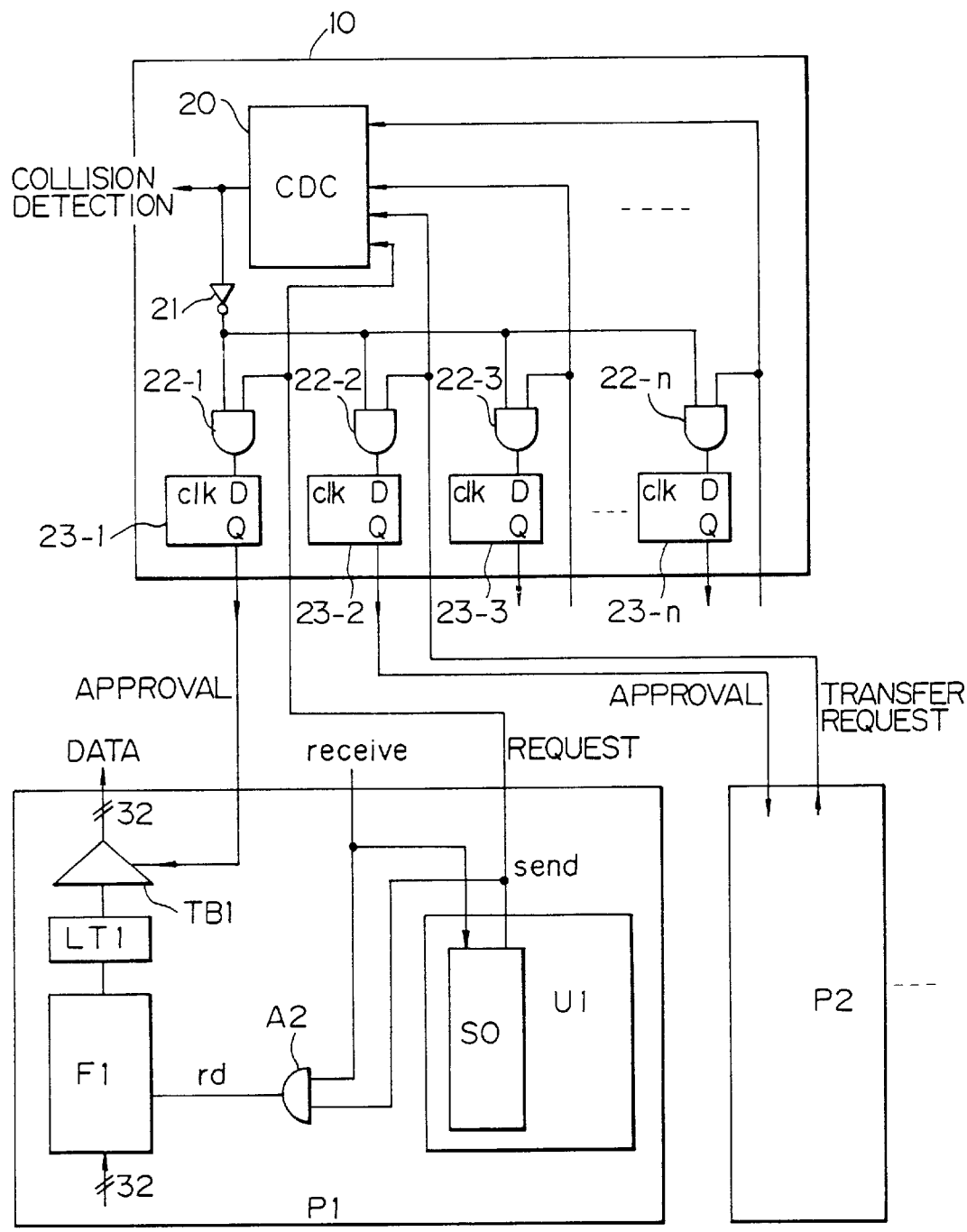
FIG. 12 is a detailed block diagram of a collision preventing circuit shown in FIG. 4.

FIG. 12 is a detailed block diagram of the collision preventing circuit shown in FIG. 4. In FIG. 12, reference number 20 denotes a collision detection circuit, 21 a NOT circuit, 22-1 to 22-n AND gates, and 23-1 to 23-n D-type flip-flop circuits. Further, in the transmission processor P1, LT1 denotes a latch circuit for holding the data from the transmission buffer F1. The AND gate A2 receives the "receive" signal from the gate GA1 and the "send" signal from the sequencer S0, and outputs the read signal "rd" to the buffer F1. The buffer F1 outputs the data in response to the "rd" signal and the data is held in the latch circuit LT1. The "send" signal is also transmitted to the collision detection circuit 20, and the collision detection circuit 20 determines whether or not the "send" signals are input from other transmission processors. When a plurality of "send" signals are simultaneously input from the transmission processors to the collision detection circuit 20, the collision detection circuit 20 predicts the occurrence of a collision on the common bus, and does not output an approval of the transmission of data to the transmission processors.

When only the processor P1 transmits the "send" signal to the collision detection circuit 20, the output of the AND gate 22-1 is input to the flip-flop 23-1 so that the flip-flop circuit 23-1 outputs "1" from the "Q" terminal to the three-state buffer TB1. The three-state buffer TB1 is opened by the "1" from the flip-flop circuit 23-1, and thus the data stored in the latch circuit LT1 can be output on the common bus L. Since the flip-flop circuit 22-1 is provided, the data is output from the latch circuit LT1 after a delay of one clock, in comparison with the "receive" signal, and accordingly, it is necessary to delay the reception of the data in the reception processor P0 for the "receive" signal. Namely as shown above in the present invention, it is possible to prevent a collision of data on the common bus L.

FIGS. 13 and 14 are views explaining the data gathering according to one embodiment of the present invention. In FIG. 13, P1 and P2 denote the transmission processors, and P0 denotes the reception processor. The data of the processors P1 and P2 is gathered in the processor P0. In this case, the processor P1 holds the data "0", "1", "4" and "5", and the processor P2 holds the data "2", "3", "6" and "7". The data from the processors P1 and P2 is arranged in order from the data "0" to "7" in the processor P0, as explained below. In FIG. 14, the registered R0 to R3 in each processor P1 and P2 have counter values indicating the number of data to be transferred.

Figure 15:
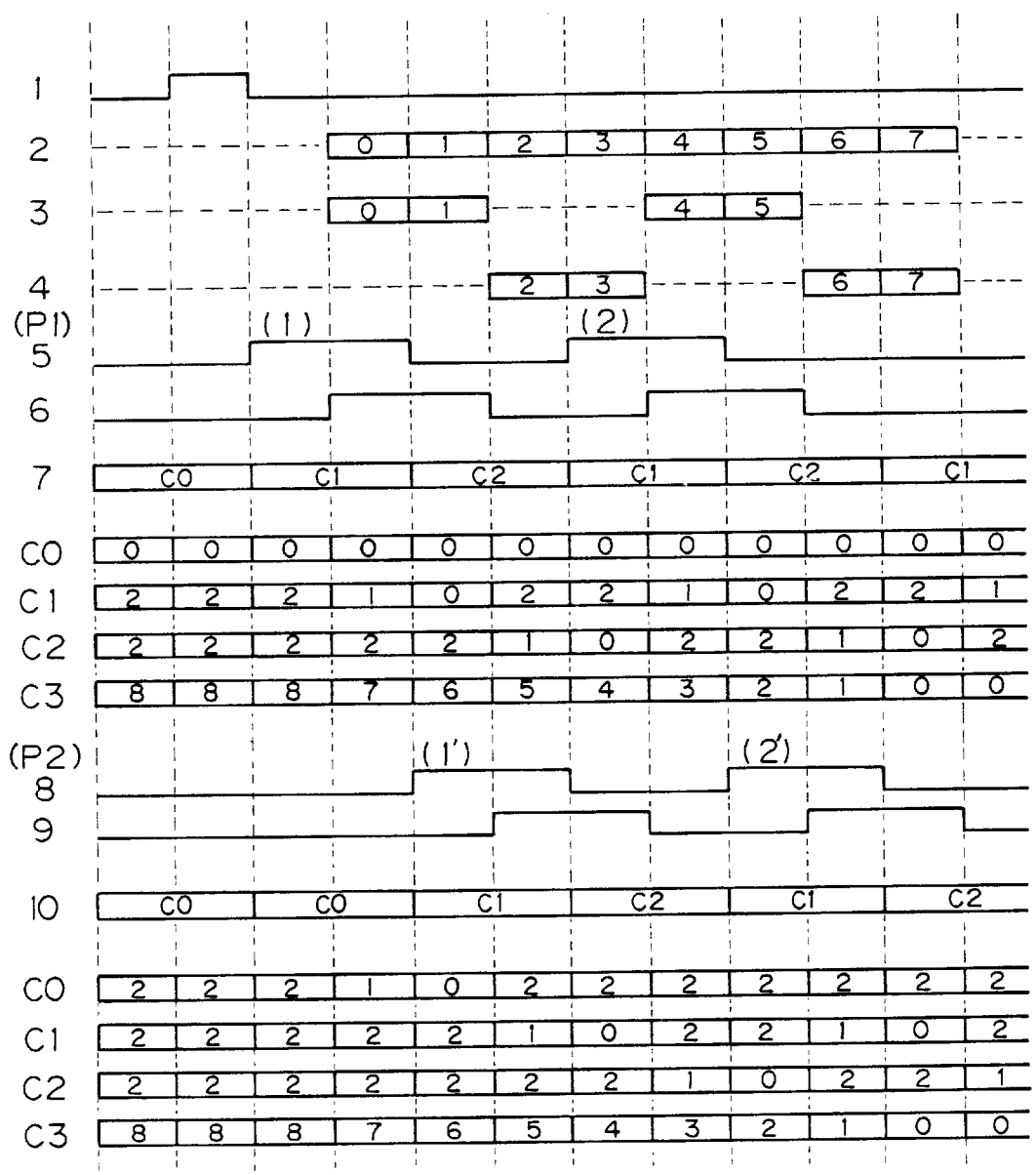
FIG. 15 is a timing chart of signals and data according to the present invention.

FIG. 15 is a timing chart of signals and data. Initially, when the transfer control circuits of the processors P1 and P2 start to operate, the data is transmitted from each processor P1, P2 to the processor P0 in accordance with the value of the counters C0 to C3. In this case, as shown in the timing chart, the transfer request signals (i.e., "send" signals) are always output from each processor P1, P2 at a timing of one clock preceding the output of data therefrom (see, 1, 2, 1' and 2').

As explained before, the basic structure of the data gathering system having the hierarchical bus structure is shown in FIG. 5. Before explaining the embodiment shown in FIG. 16, the structure of FIG. 5 is explained in detail below. In FIG. 5, each of the buffers B1 to Bn is defined as a both-way data buffer in which data from one bus is temporarily stored, and the stored data is transmitted to the other bus. Each of the buffers has two FIF0 buffers; one FIF0 (first FIF0) temporarily storing data transmitted from the lower bus to the upper bus, the other FIF0 (second FIF0) temporarily storing the data transmitted from the upper bus to the lower bus. The buffer has three states, i.e., the state in which the first FIF0 operates, the state in which the second FIF0 operates, and the state in which the first and second FIF0's do not operate.

Each of mediating circuits CA0 to CAn selects any one of the reception processor from among the many reception processors which have requested the data gathering. Except for the mediating circuit CA0, when the mediating circuit CA1 to CAn receives a gathering request from the lower processor or the mediating circuit, it transmits the gathering request to the upper mediating circuit. When the mediating circuit CA1 to CAn receives the gathering approval from the upper mediating circuit, it relays the gathering approval to the lower mediating circuit. In this case, when the mediating circuit CA1 to CAn receives the gathering requests from the lower processors, it selects one of the processors and transmits the gathering approval to that processor. Further, the signal indicating that the bus is "in use" is transmitted to the processors to which the gathering approval is not transmitted. When the upper most mediating circuit CA0 receives the gathering request from the lower mediating circuits, it transmits the gathering approval to the lower mediating circuit.

The processor P0 to Pn, which have received the gathering approval, transmit the data to the mediating buffer B1 to Bn through the common bus, and the processors P0 to P1, which did not receive the gathering approval, hold the gathering request therein. The direction of the buffer is determined based on information supplied by the mediating circuit CA1 to CAn. When the signal indicating that the bus is "in use" becomes active, either the first FIF0 or the second FIF0 of the buffer B1 to Bn is operated. In this case, when the mediating circuit connected to the first or second buffer receives the gathering approval, the mediating circuit transmits the data to the lower bus, but when the mediating circuit does not receive the gathering approval, the mediating circuit transmits the data to the upper bus. These directions are previously determined by the mediating circuit. The second mediating circuit CB0 to CBn controls the ON/OFF of the three-state buffer so that a collision of data on the hierarchical buses is prevented.

Figure 16:
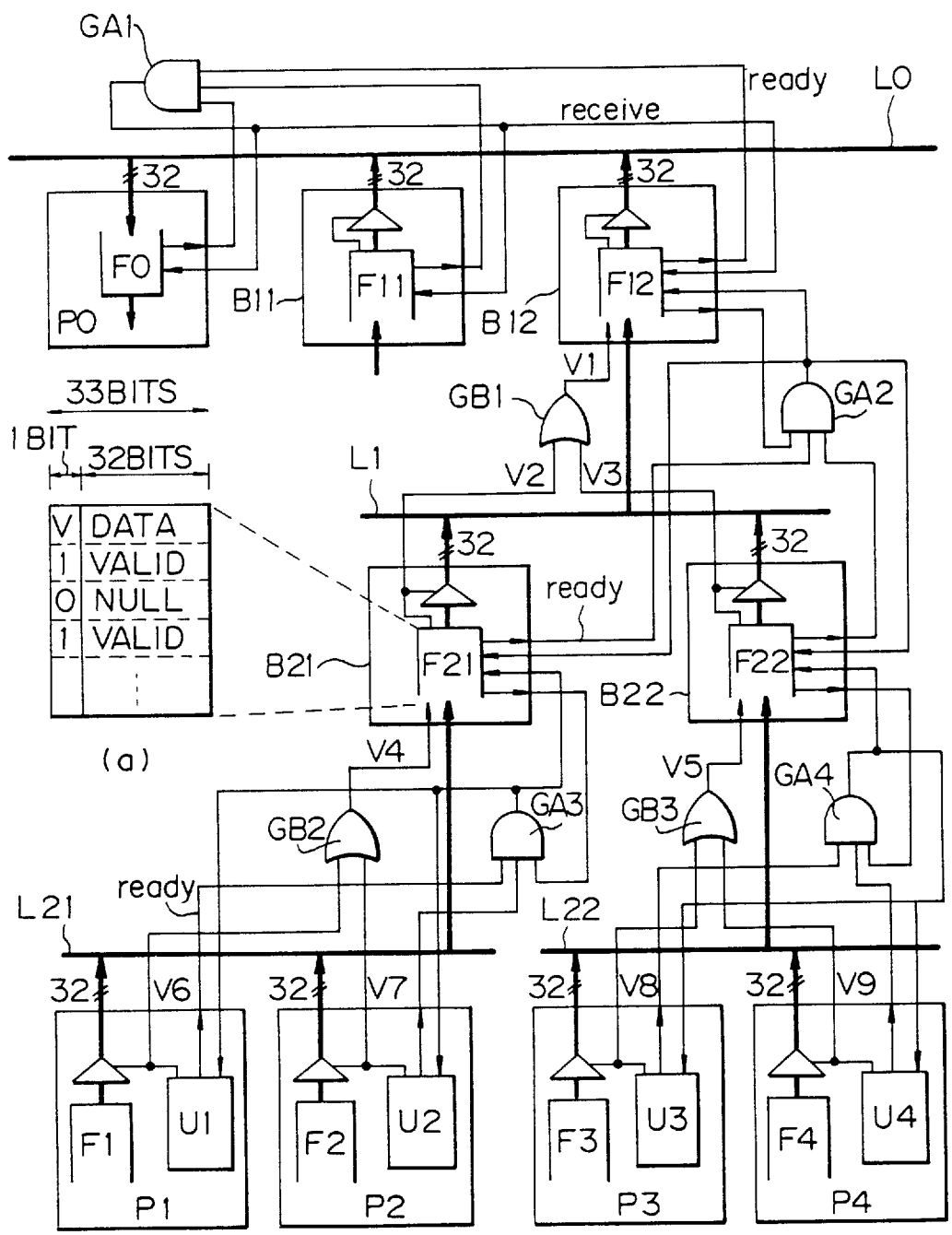
FIG. 16 is a schematic block diagram of another example of a data gathering system shown in FIG. 5.

FIG. 16 is a schematic block diagram of another example of a data gathering system constituted by a hierarchical type common bus. In FIG. 16, for example, the processor P0 gathers the data, and the processors P1 to P4 transmit the data. In this embodiment shown in FIG. 16, the explanation is given for the case wherein the processor gathering the data and the processors transmitting the data are predetermined.

In FIG. 16, L0, L1, L21, and L2 denote common buses. B11, B12, B21, and B22 denote buffers for relaying. F11, F12, F21, and F22 denote FIF0 buffers, F0 denotes a reception FIF0 buffer, F1 to F4 denote transmission FIF0 buffers, and further, U1 to U4 denote transfer control circuits.

The FIF0 buffer F21 and F22 stores a valid bit V having one bit and the data having 32 bits. Accordingly, the total bit width is 33 bits. When the valid bit V is "1", the data becomes valid, and when the valid bit is "0", the data becomes null. Each AND circuit GA1 to GA4 outputs the "receive" signal based on the "ready" signals input from processor or the buffers thereto, and each OR circuit GB1 to GB3 outputs the valid signal V based on the output from the lower buffer to the upper buffer. The valid signal V is used for controlling the ON/OFF of the three-state buffer.

Each transfer control circuit U1 to U4 operates as follows. When its own processor transmits data, the valid signal V and the "ready" signal are set to "1", and when its own processor does not transmit the data, the valid signal V is set to "0" and the "ready" signal is set to "1". When the lower processor P1 or P2 transmits the data to the common bus L21, the data and the valid signal V (="1") are written to the FIF0 buffer F21. When both of the processors P1 and P2 do not transmit the data, the "null" signal as the data and the valid signal V(="0") are written to the FIF0 buffer F21. Accordingly, the FIF0 buffer F21 detects the order of the output and controls the ON/OFF of the three-state buffer based on the state of the valid bit V ("0" or "1"). When the valid signal V is "0", the "ready" signal is set to "1" so that other processors or the buffers can transmit data on the common bus.

For example, when the order of the transmission comes to the processor P1, the data having 32 bits is transferred from the FIF0 buffer F1 to the FIF0 buffer F21. Further, the output V4 of the OR circuit GB2 is set to the bit "1" and input to the FIF0 buffer F21 as the valid signal. When the order of the transmission comes to the buffer F21, the three-state buffer is opened by the valid signal V, and the data stored in the buffer F21 is transferred to the upper FIF0 buffer F12 with the valid signal. Further, the data stored in the FIF0 buffer F12 is transferred to the FIF0 buffer F0 of the reception processor P0 based on the "receive" signal from the AND circuit GA1 through the common bus L0.

The processors P3 and P4 detect the data transmission from the processors P1 and P2 to the processor P0, on the following basis. Namely, for example, when the processor P1 transmits data to the FIF0 buffer F21 after the processors P3 and P4 have transmitted the "four-words" data to the FIF0 buffer F22, the processors P1 and P2 write the "four-words" data having the valid signal "0" (i.e., null data) into the FIF0 buffer F21. Then, when the processors P3 and P4 transmit the "four-words" data to the FIF0 buffer F22, the processor P1 can detect the completion of the data transfer from the processors P3 and P4, since the FIF0 buffer F21 is then empty of data. In practice, after the processor P1 has transmitted the "four-words" data having the valid signal "0", the processor P1 can transmit its own data before the FIF0 buffer F21 becomes empty.

Figure 17:
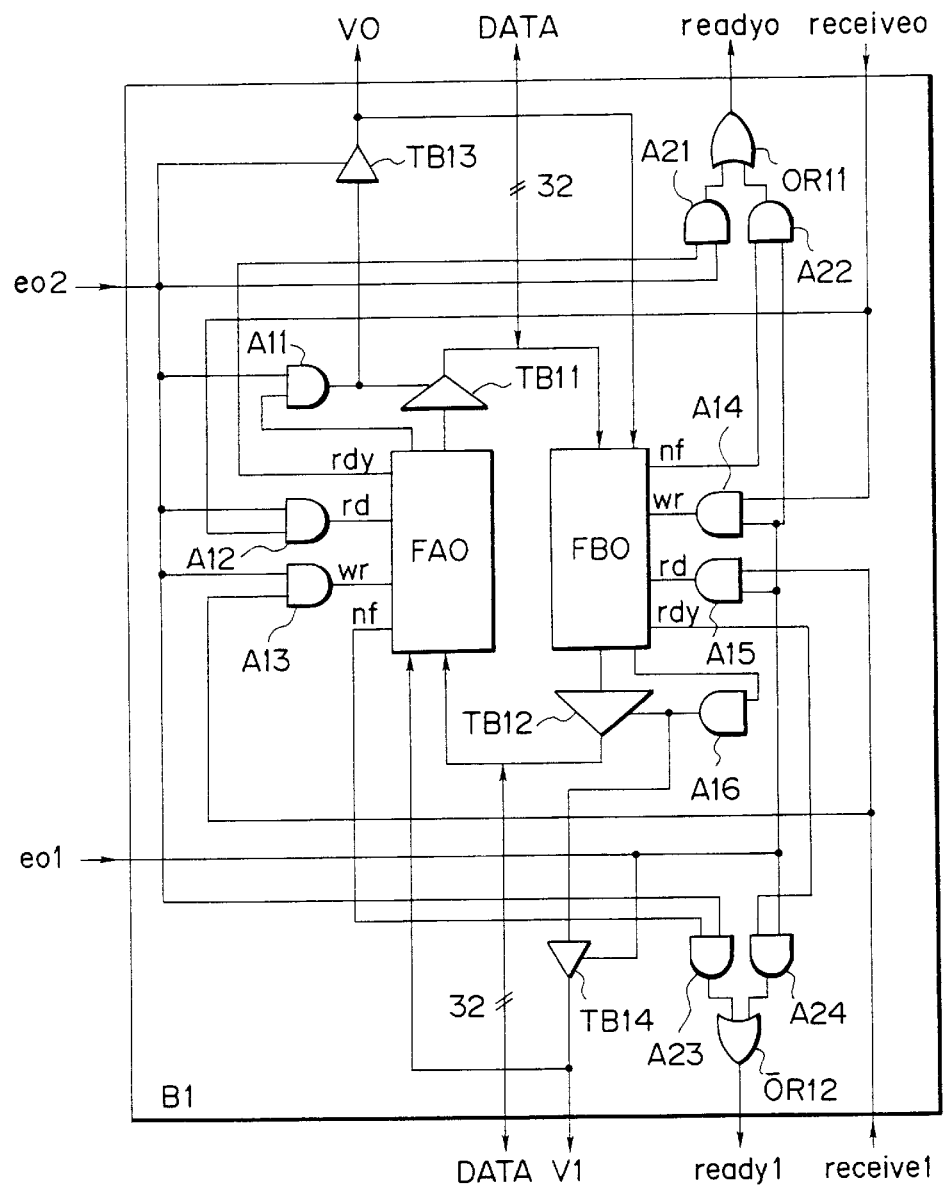
FIG. 17 is a schematic partial block diagram of a buffer shown in FIG. 16.

FIG. 17 is a schematic block diagram of another example of a buffer shown in FIG. 16. This buffer has two FIF0 buffers for a both-way transfer of data. This embodiment is utilized where the processor gathering the data and the processors transmitting the data are not predetermined in the system. In FIG. 17, FA0 denotes a FIF0 buffer for relaying the data and signals from the lower to the upper, and FB0 denotes a FIF0 buffer for relaying the data and signals from the upper to the lower. TB11 to TB14 denote three-state buffers, A11 to A24 denote AND circuits, and OR11 and OR12 denote OR circuits.

In FIG. 17, the data DATA has 32 bits, an enable signal e01 makes the FIF0 buffer FB0 active, and an enable signal e02 makes the FIF0 buffer FA0 active. These enable signals e01 and e02 are used as a control signal and are output from the mediating circuit. The signal V0 indicates a validity of data transferred from or to the upper, and the signal V1 indicates a validity of data transferred from or to the lower. The signal "ready 0" denotes the completion of the preparation of the output to the upper or of the input from the upper, and the signal "ready 1" denotes the completion of the preparation of the output to the lower or of the input from the lower. The signal "receive 0" indicates a transmission/reception command from the upper, and the signal "receive 1" indicates a transmission/reception command from the lower.

Further, the signal "rd" causes the FIF0 buffer to output the next data, the signal "rdy" indicates that there is next data in the FIF0 buffer, the signal "wr" denotes a control signal for writing data to the FIF0 buffer, and the signal "nf" indicates that there is a vacant space in which data can be received in the FIF0 buffer.

When the enable signal eo2 is "1", the FIF0 buffer FA0 becomes active based on the following signals: "ready 0"="rdy" of FA0, "ready 1"="nf" of FA0, "receive 0"="rd" of FA0, "receive 1"="wr" of FA0, V0=input, and V1=output.

When the enable signal eo1 is "1", the FIF0 buffer FB0 becomes active based on the following signals: "ready 1"="rdy" of FB0, "ready 0"="nf" of FB0, "receive 0"="rd" of FB0, "receive 1"="wr" of FB0, V0=output, and V1=input.

Figure 18:
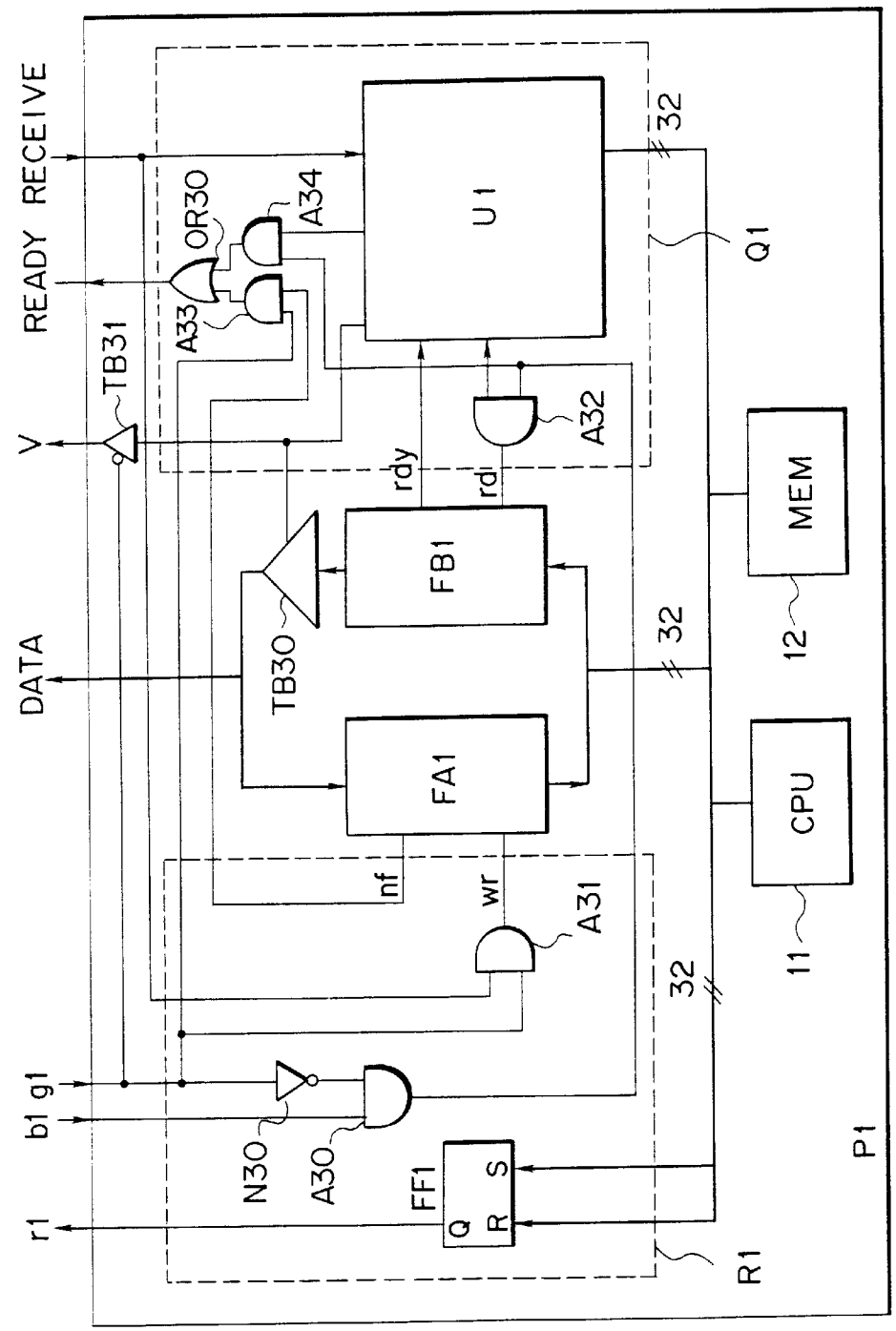
FIG. 18 is a schematic block diagram of a processor having two buffers.

FIG. 18 is a schematic block diagram of a processor constituted as a both-way processor. In FIG. 18, P1 denotes a processor, and FA1 a reception FIF0 processor, FB1 a transmission FIF0 processor. R1 denotes a request circuit for gathering data and an enable circuit for FIF0 buffer FA1, and Q1 denotes a control circuit including the transfer control circuit and a selection circuit. Further, 11 denotes a central processing unit, 12 is a memory, TB30 and TB31 are three-states buffers, FF1 is a reset-set type flip-flop circuit, A30 to A34 are AND circuits, OR30 is an OR circuit, and N30 is a NOT circuit. In FIG. 18, the signal "r1" indicates that the processor has requested data gathering, the signal "b1" denotes that a processor has gathered the data, the signal "g1" approves the gathering by above processor of the data, and the signal V indicates the output of valid data.

When this processor gathers the data, the flip-flop circuit FF1 is set by the CPU so that the request signal "r1" is set to "1". When the gathering approval signal "g1" having the bit "1" is returned, the FIF0 buffer FA1 is set to the enable state based on the signal "g1" and the "receive" signal, whereby the data is stored in the FIF0 buffer FA1. When the FIF0 buffer FA1 has a vacant space, the "ready" signal is transmitted to the transfer control circuit U1, so that data is stored in the FIF0 buffer FA1 when the "receive" signal is sent thereto.

When the processor P1 transmits the data, the gathering approval signal "g1" is set to "1" and the busy signal "b1" is set to "1", the FIF0 buffer FB1 is activated, and the FIF0 buffer FB1 transmits the data based on the control of the transfer control circuit U1. When the order of the transmission comes to its own processor P1, the valid signal V is set to "1", and the three-state buffer TB30 is opened by the valid signal.

Figure 19:
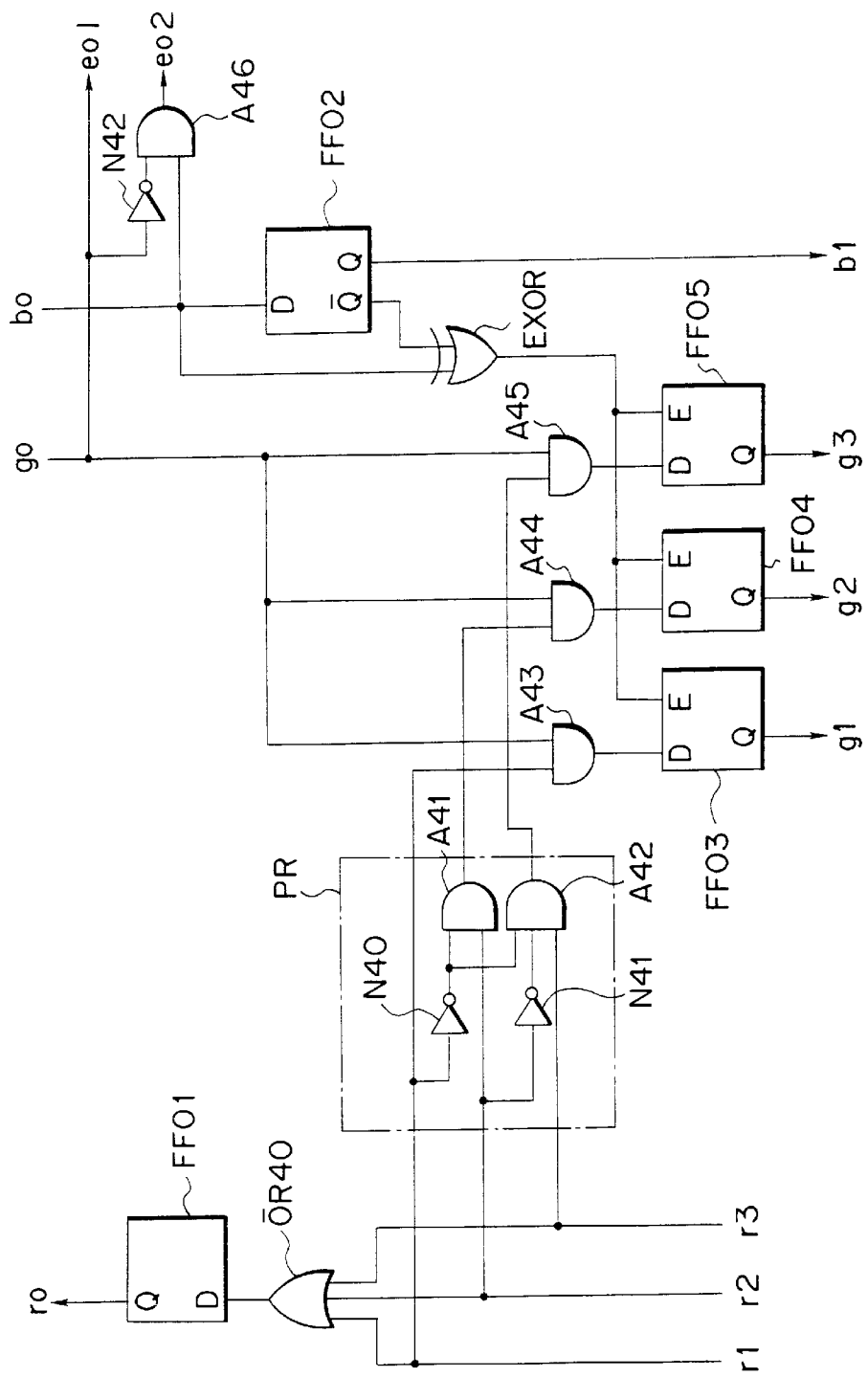
FIG. 19 is detailed block diagram of one example of a first mediating circuit shown in FIG. 5.

FIG. 19 is a detailed block diagram of one example of a first mediating circuit shown in FIG. 5. In FIG. 19, PR denotes a priority circuit for determining the priority order when competition for the gathering request occurs among a plurality of reception processors, FF01 and FF02 denote D-type flip-flop circuits, and FF03 to FF05 denote D-type flip-flop circuits each having an enable terminal. The input signal at the terminal D is held based on the clock signal when the enable input is "1". Further, EXOR denotes an exclusive OR circuit, A41 to A46 denote AND circuits, OR40 denotes an OR circuit, and N40 to N42 denotes NOT circuits.

When the request signals "r1" to "r3" indicating the gathering request are input from the lower processor or the mediating circuit, the flip-flop circuit FF01 is set by the OR circuit OR40, and outputs the request signal "r0" to the upper stage. When the upper stage returns the gathering approval signal "g0" and the busy signal "b0" to the AND circuit A45 and the flip-flop circuit FF02, the gathering approval signals "g1" to "g3" are transferred to the lower processor or the mediating circuit through the D-type flip-flop circuit FF03 to FF05. Further, the update of the D-type flip-flop circuits FF03 to FF05 is performed by the flip-flop circuit FF02 and the exclusive OR circuit EXOR when the busy signal "b0" is changed. When a plurality of gathering requests are input by the requests signals "r1" to "r3", the priority circuit PR selects one of the request signals having the highest priority order, and the gathering approval signals are returned.

When the busy signal "b0" is changed from "1" to "0", since the gathering approval signal "g0" becomes "0" and the bit "0" is input to the flip-flop circuits FF03 to FF05, the transfer request is cleared. Further, in the case of the most significant mediating circuit CA0 as shown in FIG. 5, one of the request signals "r1" to "r3" is selected so that the gathering approval signal is set to "1" and the busy signal "1" is transmitted to all lower apparatuses.

Figure 20:
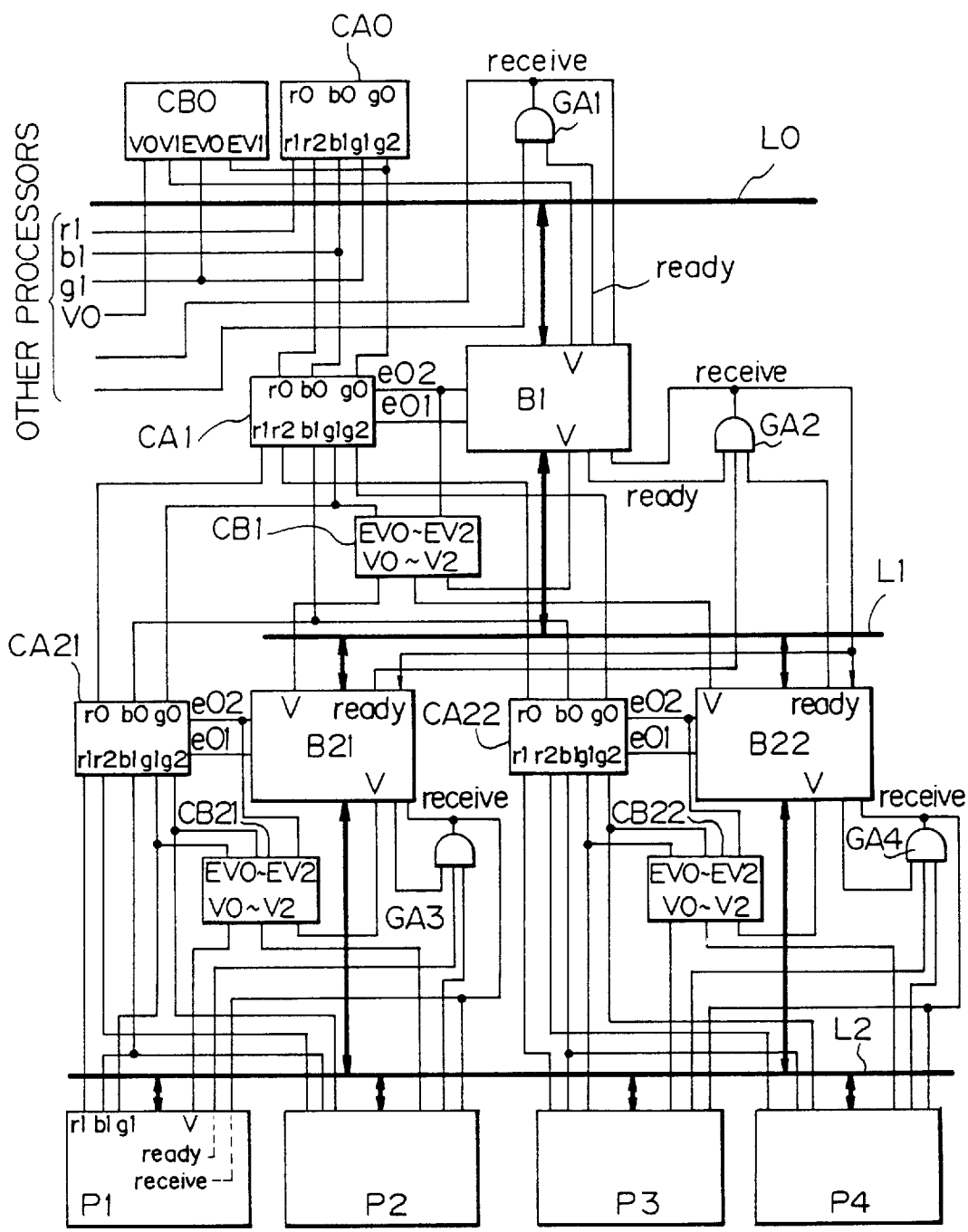
FIG. 20 is a detailed block diagram of a data gathering system having hierarchical type common buses according to the present invention.
Figure 21:
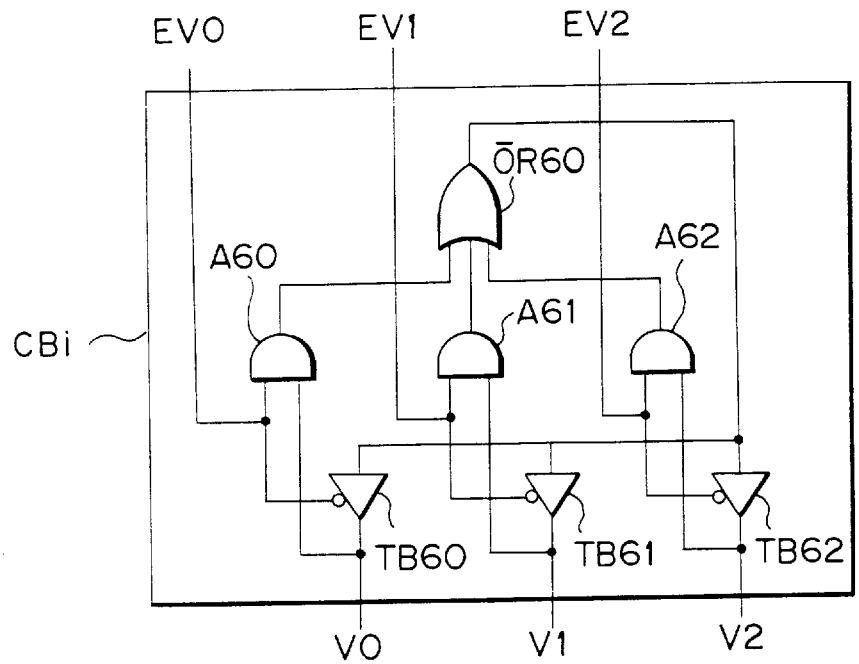
FIGS. 21 and 22 are detailed block diagrams of a second mediating circuit shown in FIG. 20.
Figure 22:
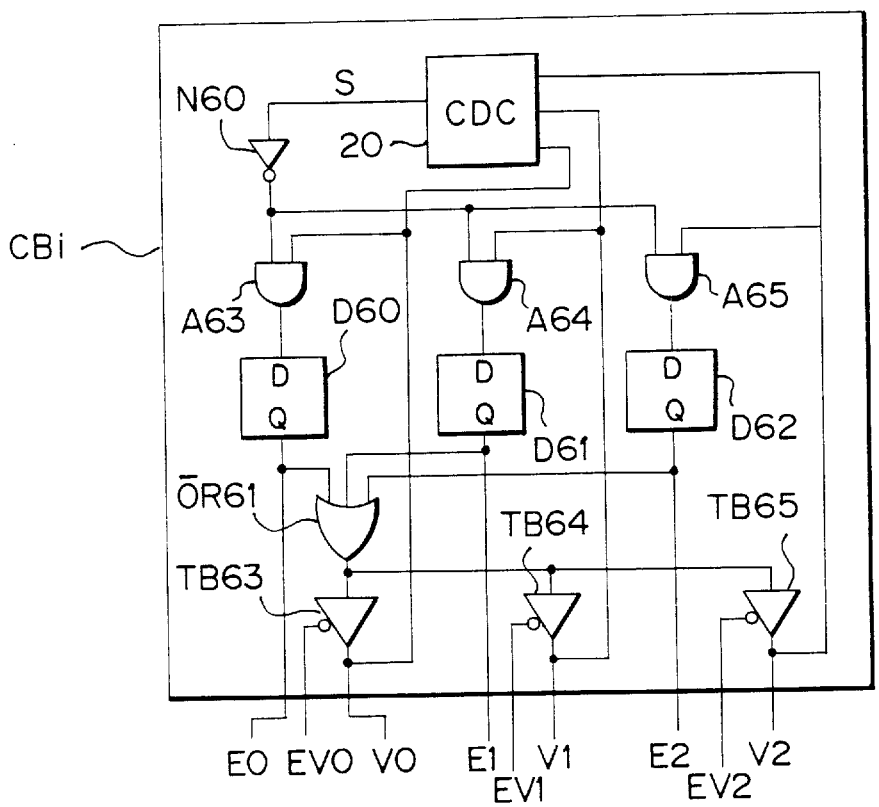

FIG. 20 is a detailed block diagram of a data gathering system having a hierarchical bus structure, and FIG. 21 and 22 are detailed block diagrams of the second mediating circuit shown in FIG. 20. In FIG. 20, the first mediating circuits CA0 to CA22 have the same structure as shown in FIG. 19. The structure shown in FIG. 21 does not include the collision preventing circuit, to thus simplify the explanation, but the structure shown in FIG. 22 does include that circuit.

In FIG. 21, A60 to A62 denote AND circuits, OR60 denotes an OR circuit, and TB60 to TB62 denote three-state buffers. The direction control signals EV0 to EV2 are used for controlling the direction of the valid signals V0 to V2, and when the signals EV0 to EV2 are set to "1", the corresponding valid signals V0 to V2 are input to the three-state buffers TB60 to TB62. When the signals EV0 to EV2 are set to "0", the corresponding valid signals V0 to V2 are output from the three-state buffers TB60 to TB62. Accordingly, it is possible to determine the direction of transfer of the data by using the second mediating circuit.

In FIG. 20, assuming that the processor P1 gathers the data, the processor P1 sets the gathering request signal "r1" to "1" and informs the mediating circuit CA21. This gathering request signal "r1" is transferred to the mediating circuits CA1 and CA0. In this case, if other processors do not transmit a gathering request signal, the processor P1 receives the gathering approval signal "g1" which is set to "1", and the busy signal "b1" is transferred to all other processors.

The first mediating circuits CA1 to CA22 generate the enable signals e01 and e02 to corresponding buffers B1 to B22 in response to the gathering approval signal "g1" and the busy signal "b0" transferred from the upper stage, and determine the direction of the data transfer.

The second mediating circuits CB1 to CB22 determine the input/output direction of the valid signals V0 to V2 in response to the gathering approval signals "g1", "g2" and the direction control signals EV0 to EV2 corresponding to the enable signals E02.

Next, an explanation is given of the collision preventing circuit shown in FIG. 22. In FIG. 22, reference number 20 denotes the collision detection circuit, A63 to A65 denote AND circuits, N60 denotes a NOT circuit, D60 to D62 denote D-type flip-flop circuits, R61 denotes an OR circuit, and TB63 to TB65 denote three-state buffers. In the signals V0 to V2, when two or more signals become "1", the collision detection circuit 20 detects the collision and outputs the signal S which is set to "1", and the transfer approval signals E0 to E2 are made "0" so that the transfer of the data is stopped. When the collision of data does not occur, the transfer approval signals E0 to E2 become "1" after a delay of one clock.

Figure 23:
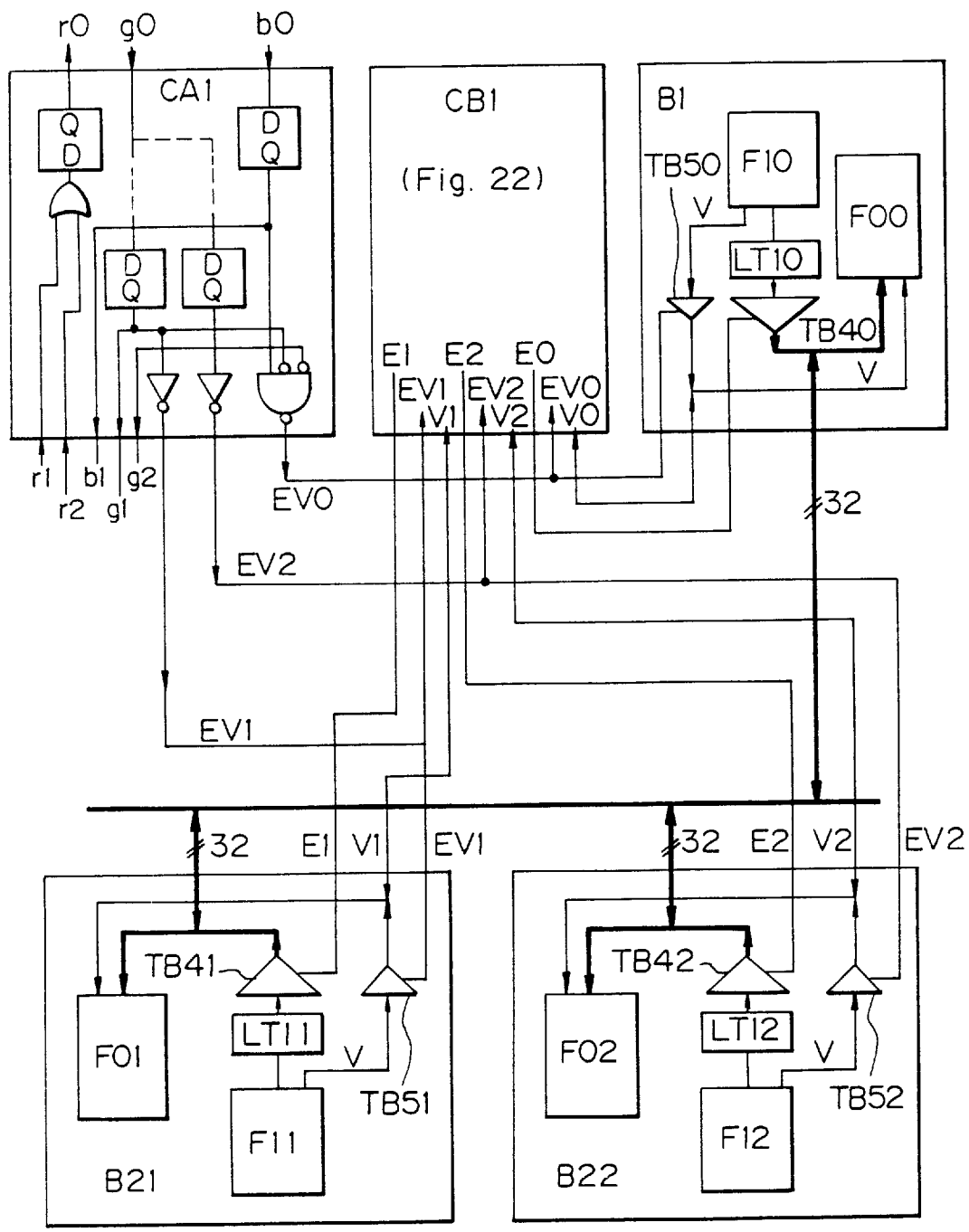
FIG. 23 is a partial detailed block diagram of a circuit shown in FIG. 20.

FIG. 23 is a partial detailed block diagram of a circuit shown in FIG. 20. As shown in the drawing, the second mediating circuit having a collision preventing function is added to this circuit. The data latch circuits LT10 to LT12 are provided for the output sides of the FIF0 buffers F10, F11, and F12, and each latch circuit temporarily holds data read out from the FIF0 buffer until the corresponding three-state buffer receives the transfer approval signal E0 to E2 from the second mediating circuit CB1. When the second mediating circuit CB1 detects that the collision of the data does not occur on the common bus, the three-state buffer TB is opened by the transfer approval signal E0 to E2 so that the data is transferred from the latch circuit LT to the common bus through the three-state buffer TB.

Figure 24:
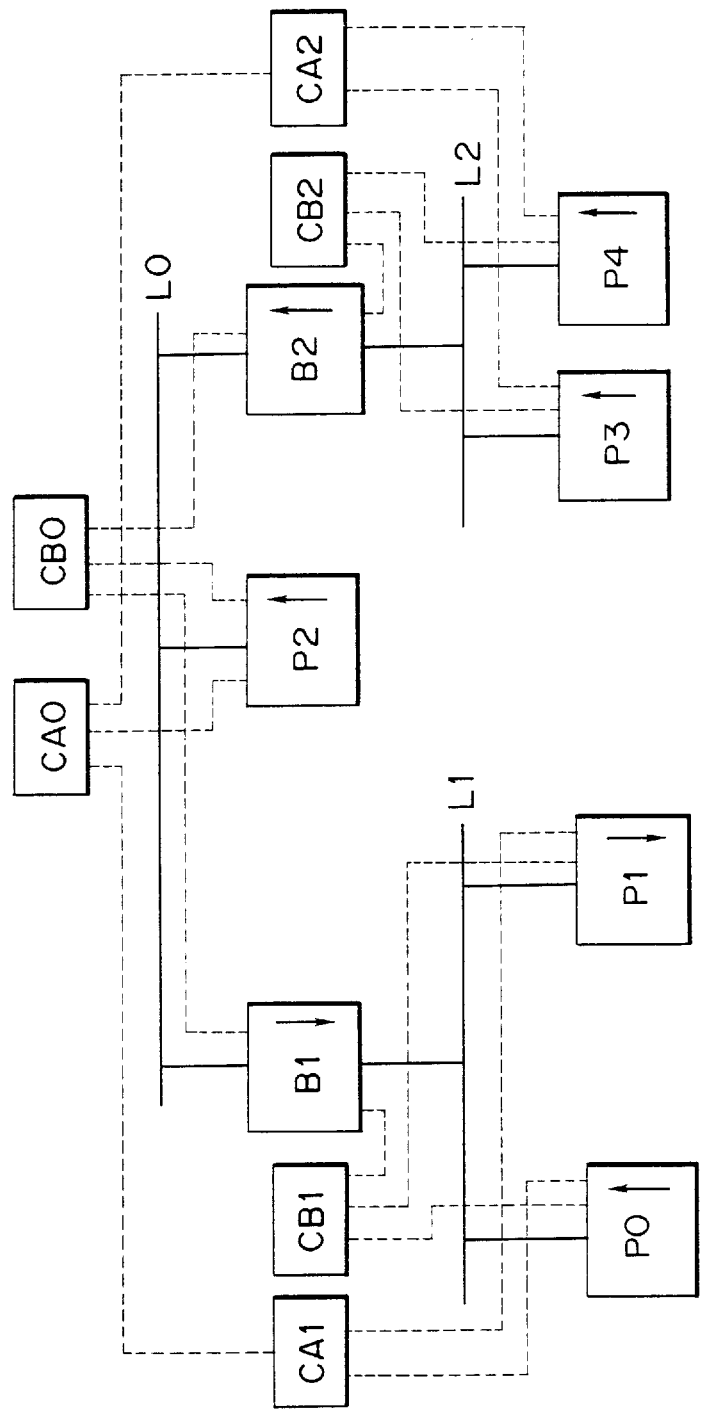
FIG. 24 is a view explaining one example of data gathering according to the present invention.
Figures 25, 26:
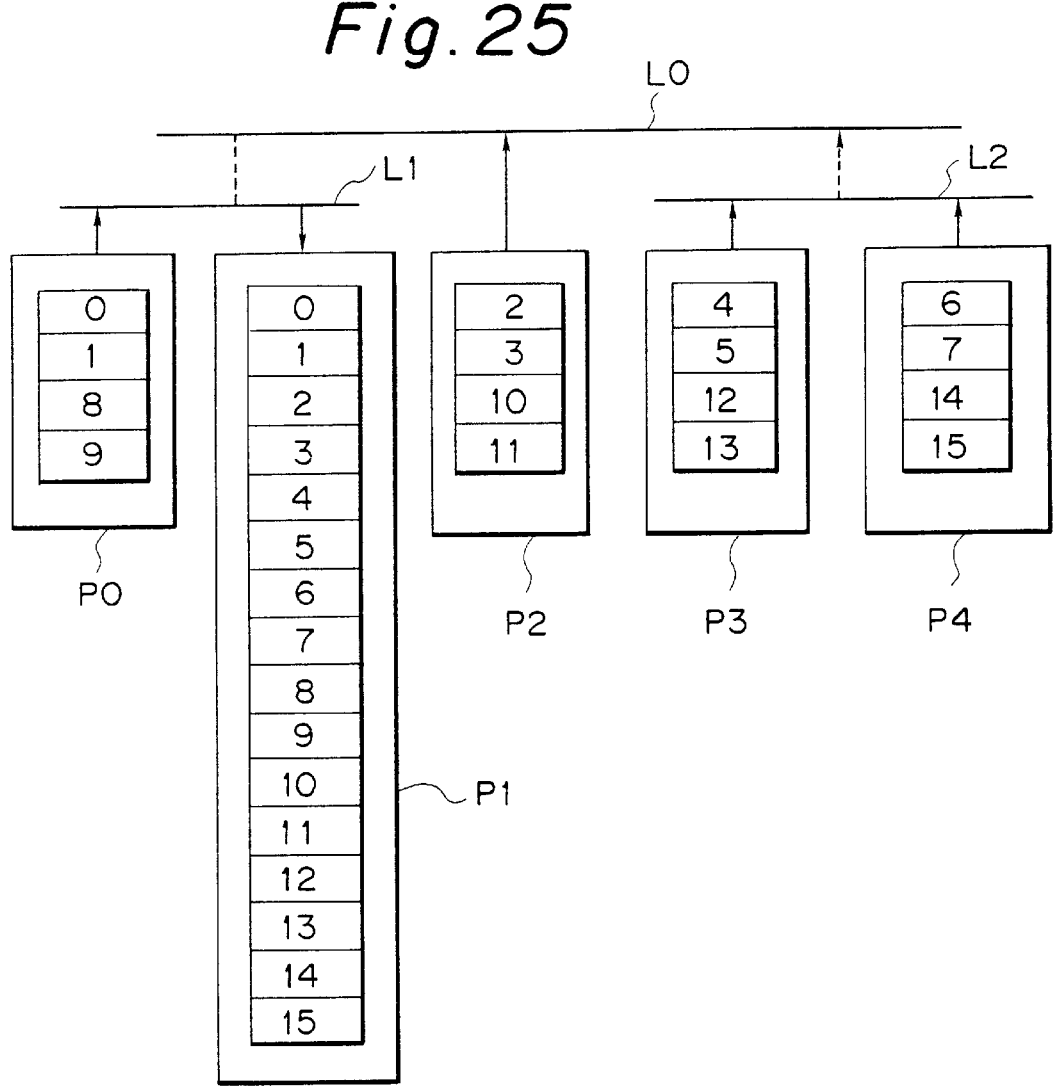
FIGS. 25 and 26 are views explaining one example of data gathering according to the present invention.
Figure 27:
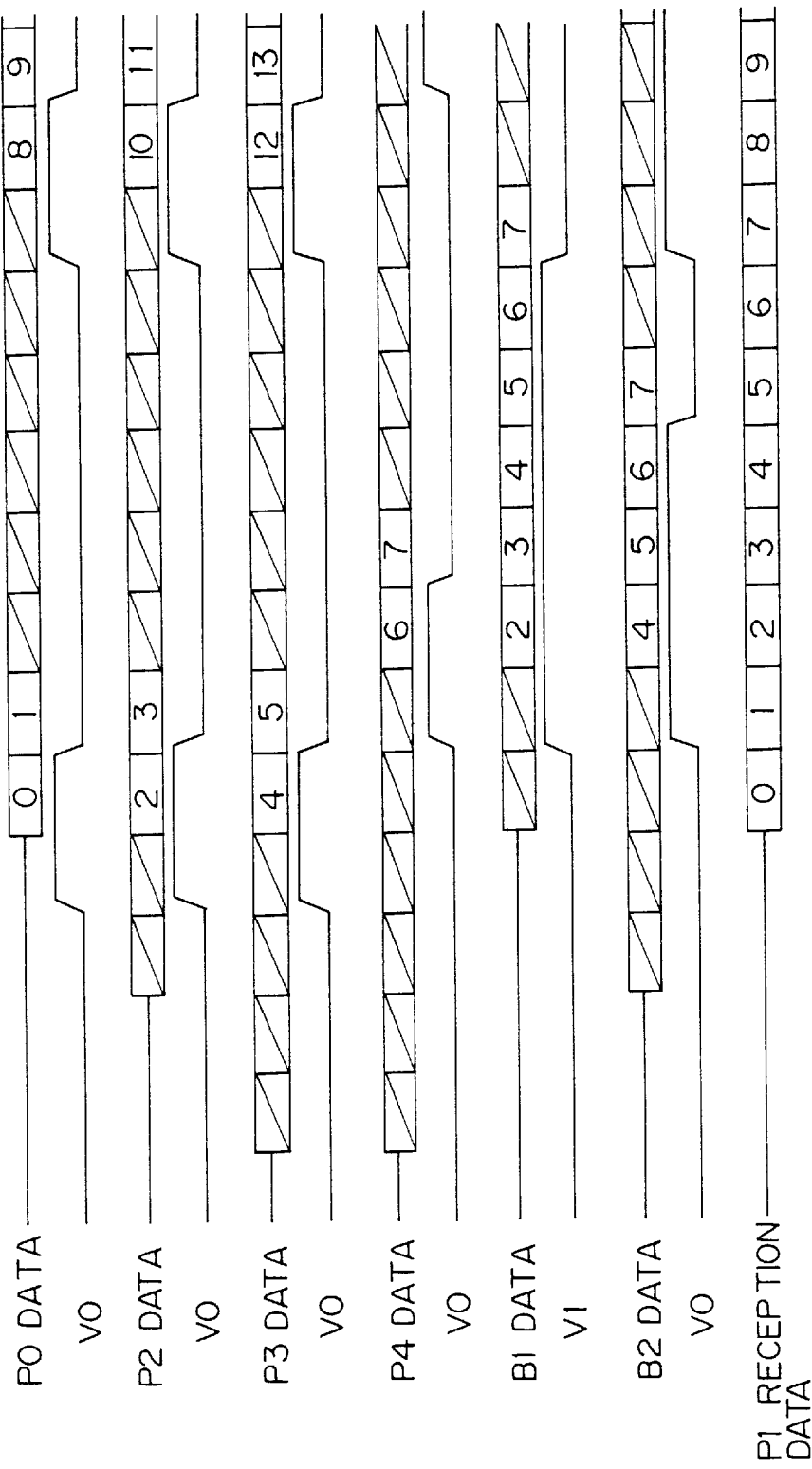
FIG. 27 is a timing chart of data and signals according to the present invention.

FIG. 24 is a view explaining one example of the data gathering according to the one aspect of the present invention, FIGS. 25 and 26 are views explaining one example of data gathering according to the present invention, and FIG. 27 is a timing chart of data and signals according to the present invention. In FIG. 24, assuming that the processor P0 gathers the data from other processors P1 to P4, when the processor P0 transmits the gathering request signal, the first mediating circuits CA0 to CA2 control the transfer direction of the buffers B1 to B2 and the processors P0 to P4 as shown by the arrow.

In FIG. 25, as shown in the drawing, the processor P1 gathers the data from "0 to 15", and the processors P0, P2 to P4 transmit the data to the processor P1. The data "0 to 15" are scattered as follows; the processor P0 handles the data "0, 1, 8, 9", the processor P2 handles the data "2, 3, 10, 11", the processor P3 handles the data "4, 5, 12, 13", and the processor P4 handles the data "6, 7, 14, 15".

To gather the data to the processor P1, the initial values shown in FIG. 26 are set to the counters C0 to C3 in the transfer control circuit of each of the processors P0, P2 to P4.

Accordingly, the transmission processors P0, P2 to P4 transmit the data, and the processor P1 receives the data, at the timing shown in FIG. 27. When the order of the transmission comes to its own processor, the processor transmits the real data after the valid signal V is set to "1". The processors, which are not in the order of transmission, transmit the null data (slant portion of the timing chart) having a valid signal "0", instead of the real data. As explained above, since each processor independently determines the timing of the data transfer in accordance with the values set to the counters C0 to C3, it is possible to avoid unnecessary time (overhead) in the timing of switching of the processor. Further, the processor P1 can automatically arrange the data in order, and thus it is not necessary to rearrange the data in order in the reception processor P1.

According to one aspect of the present invention, in a parallel computer having a plurality of processors, when one reception processor gathers data scattered in other transmission processors, it is possible to realize a high speed switching operation among the transmission processors, and it is not necessary to rearrange the data in order after gathering data in the reception processor, and as a result, it is possible to achieve a high speed data processing operation in a parallel computer.

The following explanation is of the data scattering system according to another aspect of the present invention. In a parallel computer, original data to be processed is scattered as a plurality of data in accordance with the number of processors. The data assigned is processed in each processor, and accordingly, it is necessary to realize a high speed scattering of data from one processor to the other processors.

Figure 28:
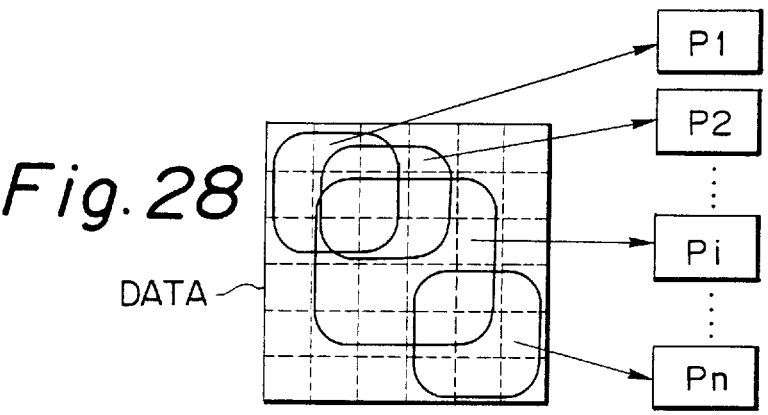
FIGS. 28 to 30 are views for explaining data scattering in a parallel computer constituted by a plurality processors.
Figure 29:
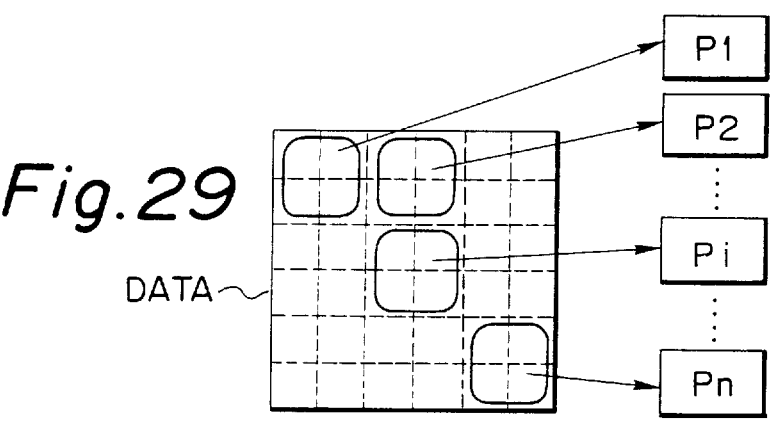
Figure 30:
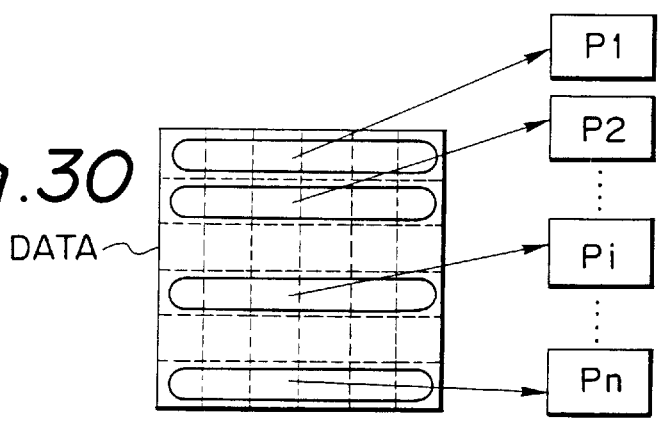

FIGS. 28 to 30 are views explaining the data scattering in a parallel computer constituted by a plurality of processors P1 to Pn. In the parallel computer, two-dimensional data DATA is divided into a plurality of data blocks each having a different scope (see, solid lines in the drawings), and each data block is assigned to a corresponding processor to be processed therein.

In the prior art, two methods are used for a data transfer from the transmission processor to the reception processor (or processors) through the common bus; one is a processor-to-processor communication, and the other is a broadcasting communication. In the former, the transmission processor selects the particular data block, and the selected particular data block is transmitted to a predetermined reception processor. In the latter, the transmission processor transmits all data to all reception processors by a broadcasting operation (i.e., all data are simultaneously transmitted as in a broadcast), and the desired data is selected by each reception processor in accordance with predetermined software.

In the latter case, a long time is necessary for the data transfer because, particularly in the case of FIG. 28 (data overlap each other), it is necessary to repeatedly transmit the overlapped portions to many processors.

Figure 31:
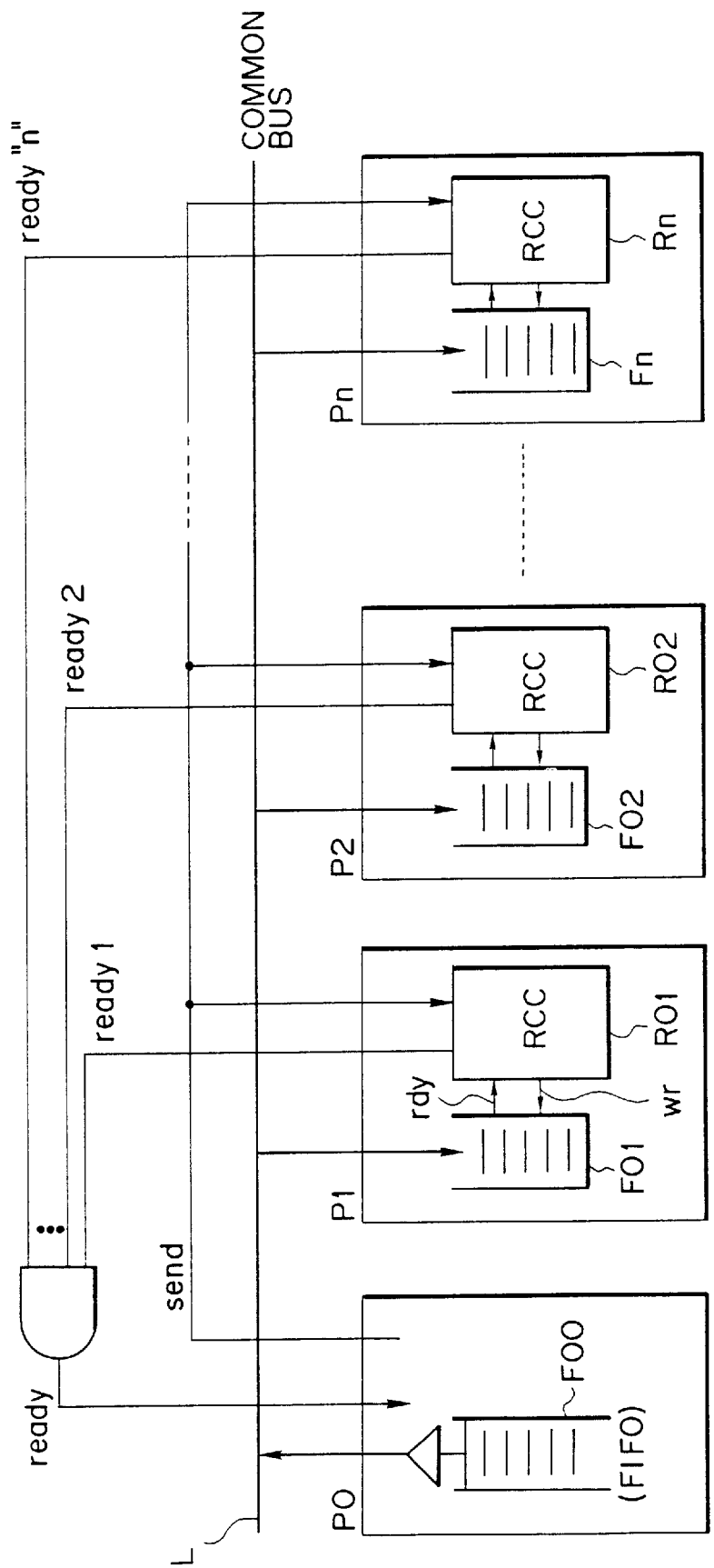
FIGS. 31 is a schematic block diagram of a data scattering system constituted by a flat type common bus.

FIG. 31 is a schematic block diagram of a data scattering system constituted by a flat type common bus. The same reference numbers as used in a data gathering system are attached to the same components in this drawings. In FIG. 31, F00 denotes a transmission buffer, and F01 and F02 denote reception buffers. These buffers are constituted by FIFO buffers. Further, R01 and R02 denote reception control circuits. The processor P0 transmits the data and the processors P1 and P2 receive this data. The processor P0 sequentially transmits all data from the transmission buffer F00 to the common bus L. The reception control circuit is constituted by hardware and has a function of selecting data to be received from among all data on the common bus L, in accordance with reception information. The reception information is set to counters as explained in detail below. The reception control circuit is constituted by the sequencer and transfer control circuits having counters and registers, as explained in detail below.

Figure 32:
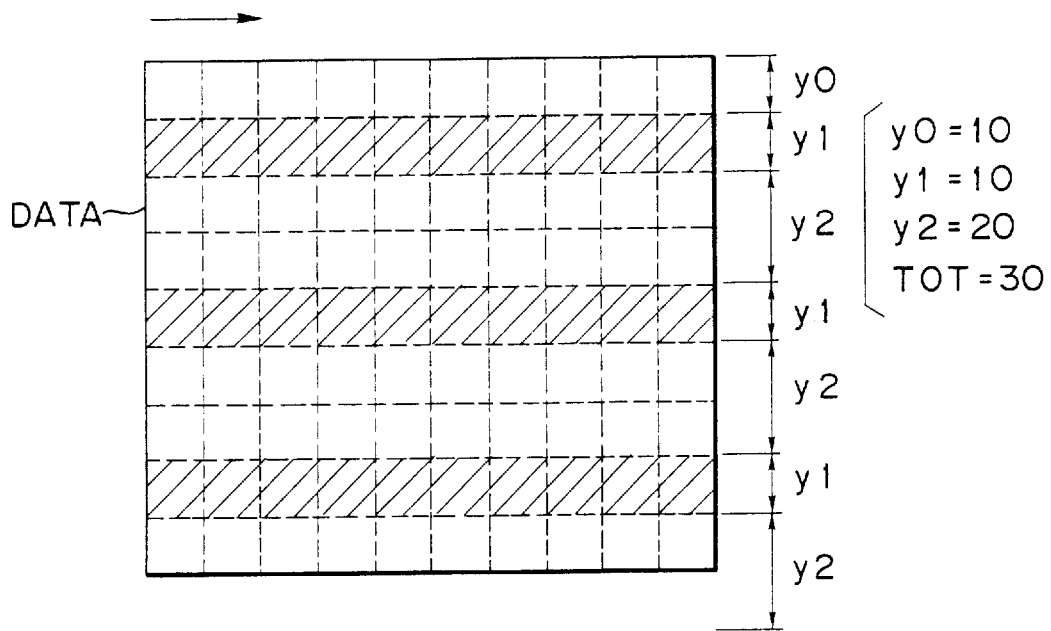
FIGS. 32 and 33 are views explaining reception data.
Figure 33:
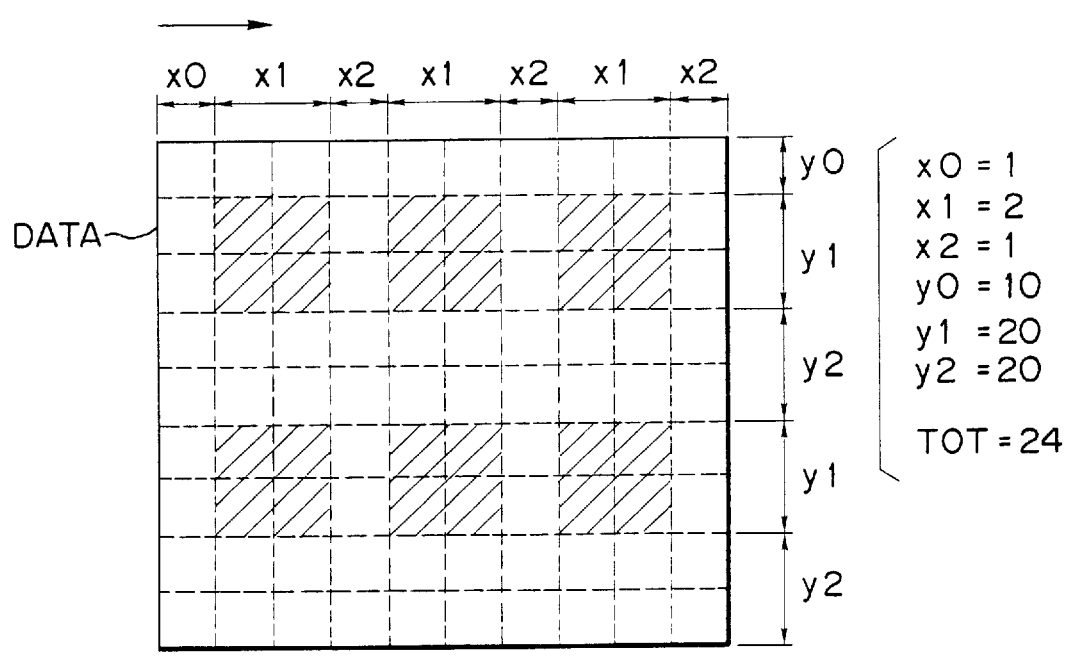

FIGS. 32 and 33 are views explaining the reception data. In FIGS. 32 and 33, two-dimensional data DATA is shown by a slant line. Assuming that the data shown in FIG. 32 is transmitted to the processor P1 and the data shown in FIG. 33 is transmitted to the processors P2, the processors P1 and P2 prestore the reception schedule of the data in the reception control circuits R01 and R02. The reception schedule is one-dimensional data in the case of FIG. 32, and two-dimensional data in the case of FIG. 33. In this case, the data can be expressed as follows.

y0(x0): numbers of words to be initially thrown away, y1(x1): numbers of words to be received, y2(x2): numbers of words to be thrown away, until reception of data is again started, and TOT: total numbers of words to be received.

In the data reception shown in FIG. 33, when the conditions of the count "x" and "y" are both satisfied, they are recognized as reception data.

When the processor P0 transmits all data expressed by these drawings to the processors P1 and P2 through the common bus L, the reception control circuit R01 and R02 checks the data and determines whether or not data to be received in its own processor. That is, in the reception control circuit R01 and R02, when the order of the reception comes to its own processor in accordance with the reception count, i.e., y0 to y2 (x0 to x2) and total number of reception, the reception control circuit transmits the write signal "wr" to the reception buffer. Further, the reception control circuit controls its own counters each time the processor P0 transmits data, and determines whether or not the next data should be received.

In this case, the processor P0 transmits the data to the common bus L when all reception processors satisfy any one of the following conditions;

1) The next data is the data to be received, and further, there is a vacant space in the reception buffer.

2) The reception processor does not receive the next data.

One hand-shake signal "ready" is used for determining whether or not the reception processor satisfies the above conditions 1) and 2). The other hand-shake signal "send" is used for informing the fact that the processor P0 has transmitted the data.

Figure 34:
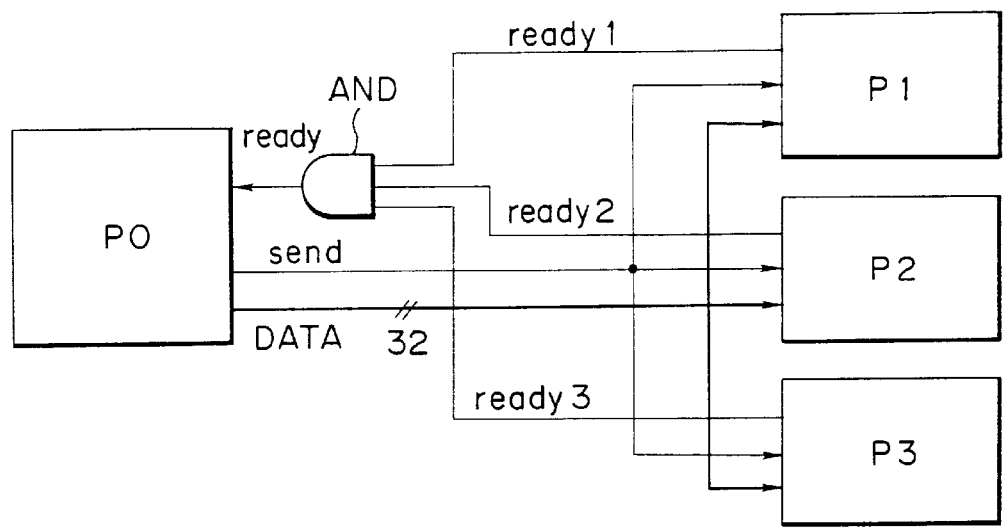
FIG. 34 is a schematic block diagram of an interface between processors.
Figure 35:
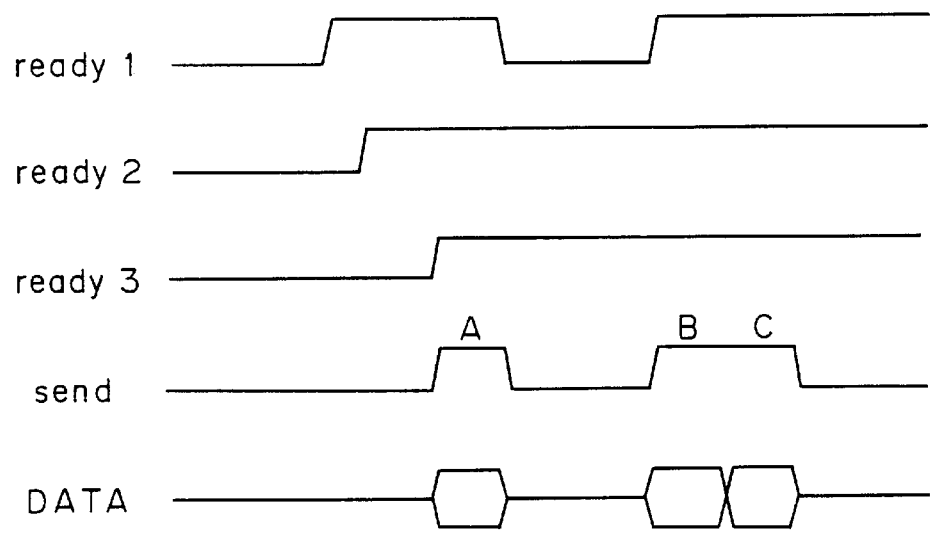
FIG. 35 is a signal timing chart of the structure shown in FIG. 34.

FIG. 34 is a schematic block diagram of an interface between processors, and FIG. 35 is a signal timing chart of the structure shown in FIG. 34. The transmission processor P0 transmits the data at this timing when all "ready" signals from the processors P1 to P3 become "1" and the processor P0 has data to be transmitted.

In FIG. 35, at the timing "A", since all ready signals 1 to 3 are high, so that a ready signal is output from the AND circuit, the processor P0 transmits the data DATA to the processors, and when the ready signal 1 is low, the data transfer is stopped. In the timing of "B" and "C", the processor P0 can transmit the data DATA to the processors.

Figure 36:
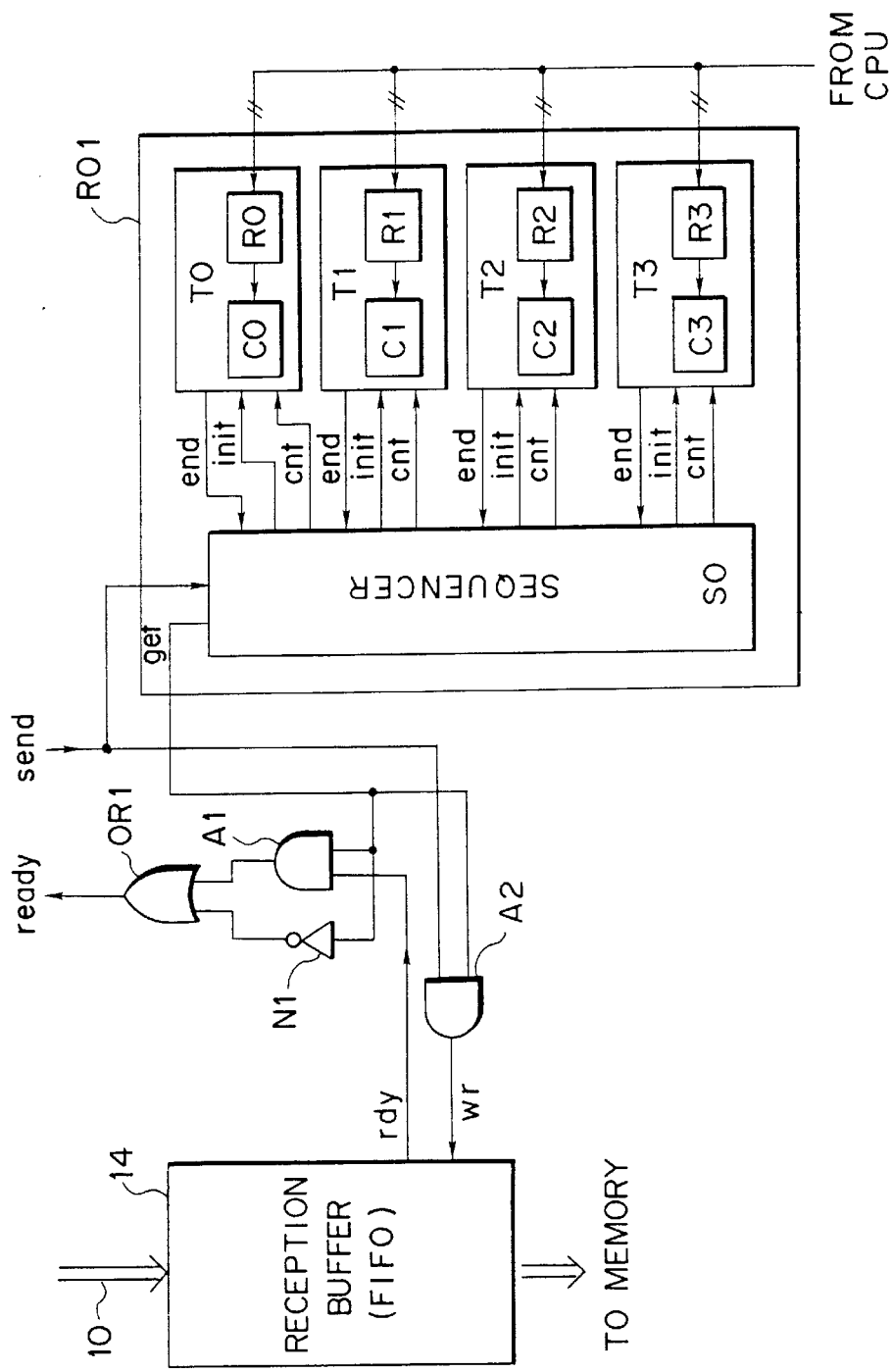
FIG. 36 is detailed block diagram of a reception control circuit shown in FIG. 31.

FIG. 36 is a detailed block diagram of the reception control circuit. The reception control circuit has the same structure as the transfer control circuit shown in FIG. 7. As previously explained, T0 to T3 denote counter control circuits each including a counter and a register, A1 and A2 denote AND circuits, N1 denotes a NOT circuit, and OR1 denotes an OR circuit.

The word "rdy" indicates a "write enable" signal when the reception buffer has a vacant space, "wr" indicates a write signal, "end" indicates an end signal of the counting operation, "init" indicates a command signal for initializing the counter, "cnt" indicates a counter control signal, and "get" indicates a signal that the reception condition for the next data is satisfied.

For example, in the reception data shown in FIG. 32, the CPU of the reception processor presets the value of y0 (10) to the register R0, the value of y1 (10) to the register R1, the value of y2 (20) to the register R2, and total number or reception data (30) to the register R3. In the counter control circuits T0 to T3, each counter C0 to C3 counts in response to the count control signal "cnt" after the "init" signal from the sequencer S0 is input to the counter. When the counter counts the value stored in the corresponding register, the "end" signal is transmitted to the sequencer S0.

The counter C0 counts the numbers of words waiting for transmission until the counter C0 initially receives the data, the counter C1 counts the numbers of words sequentially received, the counter C2 counts the numbers of words awaiting transmission until the reception is started again after the reception of the data of the counter C1, and the counter C3 counts the total number of data actually received.

The sequencer S0 is started by the "send" signal and the clock signal, and outputs the "get" signal "1" when the next data is determined to be the data to be received in accordance with the output of the counter control circuits T0 to T3. When the "get" signal and the "send" signal are "1", the AND circuit A2 outputs the write signal "wr" to the reception buffer F01. When the "get" signal is "0", or when the "get" signal is "1" and there is vacant space in the reception buffer F01, the "ready" signal is set to "1". As previously explained, the counter C0 is constituted by a down-counter or an up-counter.

In FIG. 36, briefly, the sequencer S0 operates as follows. First, the counter C0 starts to count the number of data in response to the "send" signal, and when the counting operation is completed, the counter outputs the "end" signal to the sequencer S0. Then, the sequencer S0 transmits the "get" signal to the reception buffer R01, and at the same time, the counter C1 starts to count the number of data. The reception Buffer R01 receives the data until the counting operation is completed. Finally, when the counting operation of the counter C1 is completed, the counting operation of the counter C2 is started, and when the counting operation of the counter C2 is completed, the counter C1 is initialized and the data reception is again started. The counter C3 continues to count the number of the data, and when the counting operation is completed, the data reception operation is completed.

FIGS. 37A and 37B are a flowchart explaining the operation of the sequencer. First, the counters C0, C1 and C3 are initialized (step 1), and when the "send" signal is "1", the counting operation is started (step 2). Since the initial "send" signal informs the reception processor of the start of the "get" signal is "0" and the data is not received at the reception buffer. Next, the sequencer S0 determines whether or not the counting operation of the counter C3 is completed (step 3). When the result is "YES", the reception operation is completed, and when the result is "NO", the sequencer S0 determines whether or not the counting operation of the counter C0 is completed (step 4). When the result is "NO", the "get" signal is set to "0" when an incoming of data is shown by the "send" signal, and the data is thrown away. Then, only the counting operation of the counter C0 is started (step 5). When the result is "YES" in the step 4, i.e., when the counting operation of the counter C0 is completed, the counter C2 is initialized (step 6). In this case, when the counting operation of the counter C1 is started, the "get" signal is set to "1".

Again, the sequencer S0 determines whether or not the counting operation of the counter C3 is completed (step 7). When the result is "YES", the reception operation is completed, and when the result is "NO", the sequencer S0 determines whether or not the counting operation of the counter C1 is completed (step 8). When the result is "NO", the data is written into the reception buffer and the counting operation of the counters C1 and C3 is started (step 9). When the result is "NO" in step 8, the "get" signal is set to "0" and the counter C1 is initialized (step 10).

Still further, the sequencer S0 determines whether or not the counting operation of the counter C3 is completed (step 11). When the result is "YES", the reception operation is completed. When the result is "NO", the sequencer S0 determines whether or not the counting operation of the counter C2 is completed (step 12). When the result is "YES", the routine returns to step 7. When the result is "NO", the data is thrown away when an incoming of data is shown by the "send" signal. Then, only the counting operation of the counter C2 is started (step 13).

In this case, the initialization of counters at steps 6 and 10 is not always performed at this timing, and it is possible to overlap same as explained below.

Figure 38:
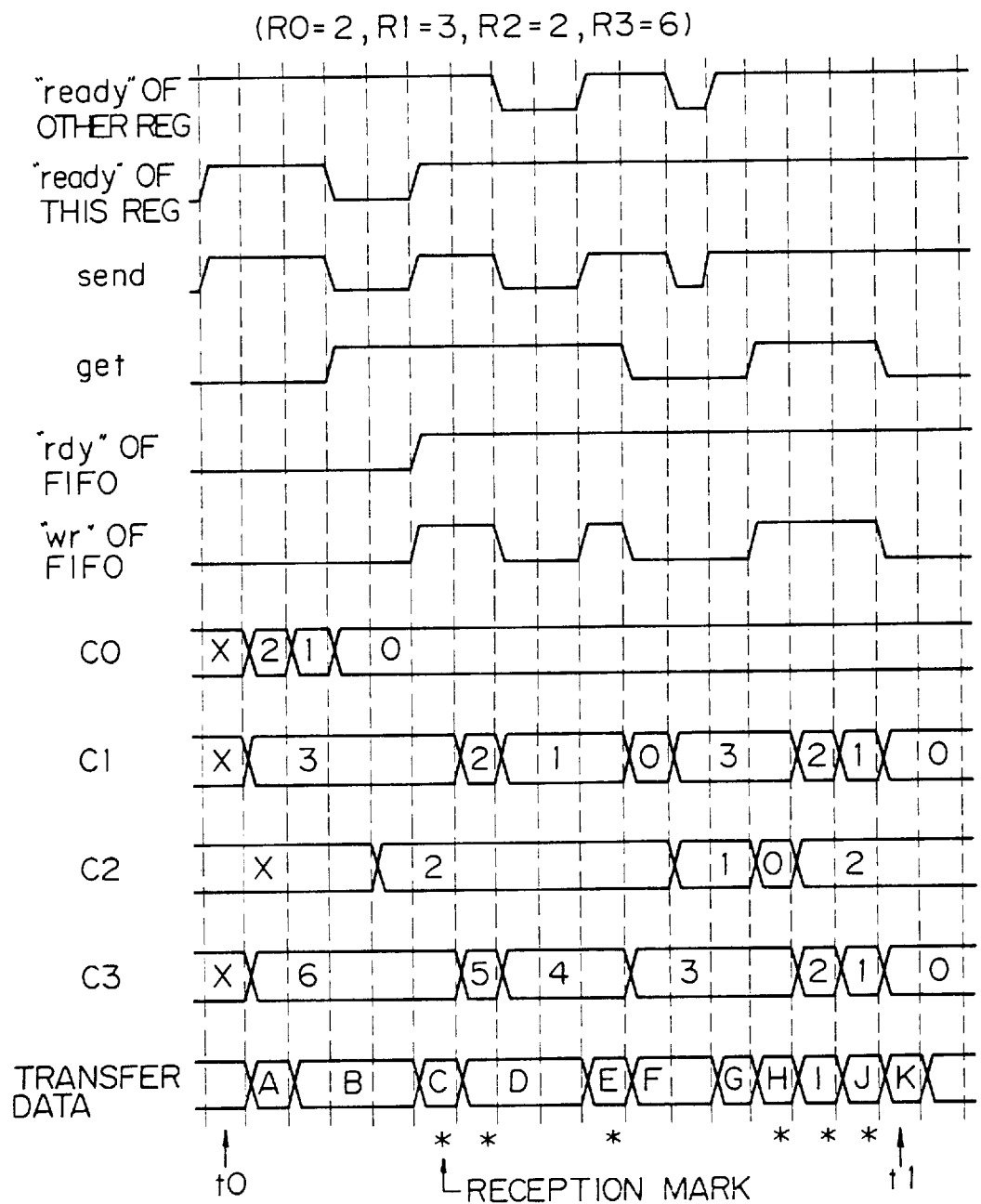
FIG. 38 is a timing chart of signal and data of the structure shown in FIG. 31.

FIG. 38 is a signal timing chart according to the present invention. The CPU sets the parameters 2, 3, 2, 6 to corresponding registers R0 to R3, and at the timing "t0", since the "send" signal is "1", the reception is started. In this case, when the "send", the "get" signal and the "wr" signal are high, the transmission data A to K from the processor P0 can be received at the timing of "C", "D", "E", "H", "I", and "J", as marked by "*". At the timing "t1", the value of the counter C3 becomes "0", and the reception processor completes the reception operation.

Figure 39:
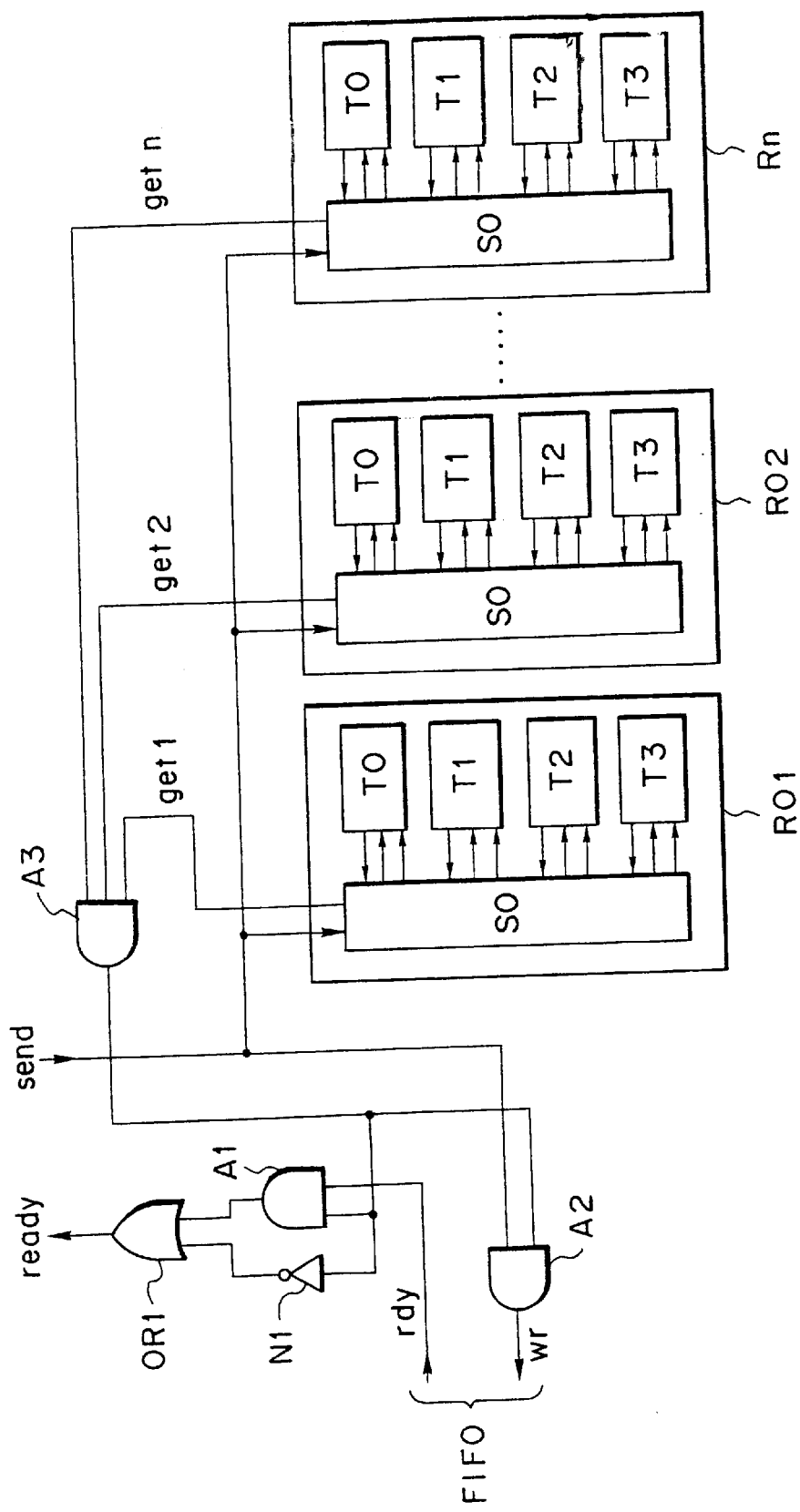
FIG. 39 is a detailed circuit diagram of another example of the reception processor shown in FIG. 31.
Figure 1:
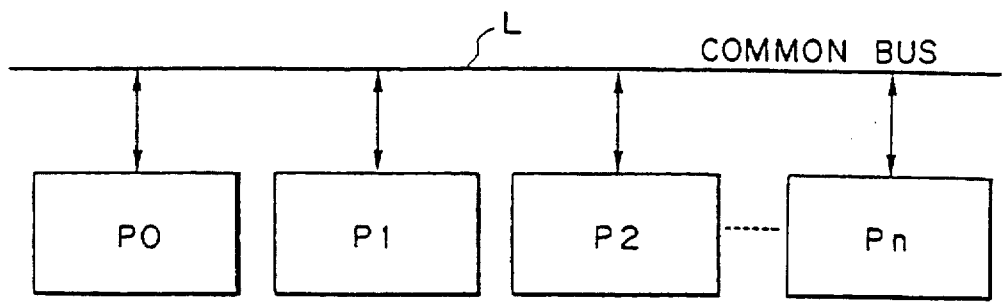
Figure 2:
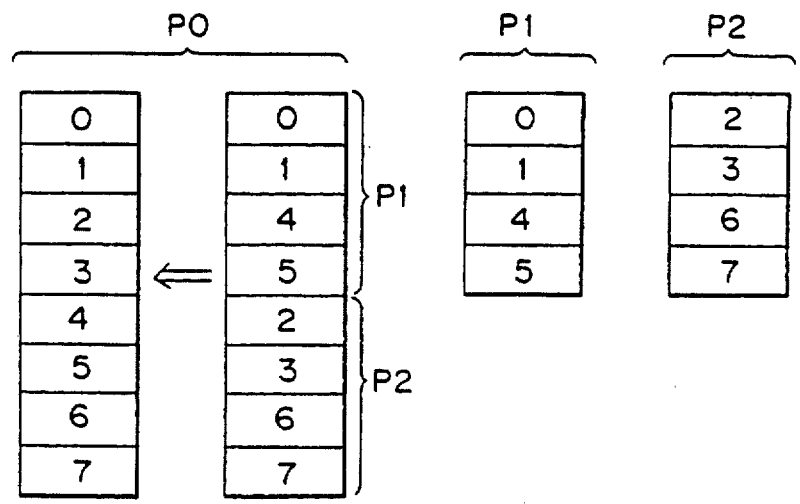
Figure 3:
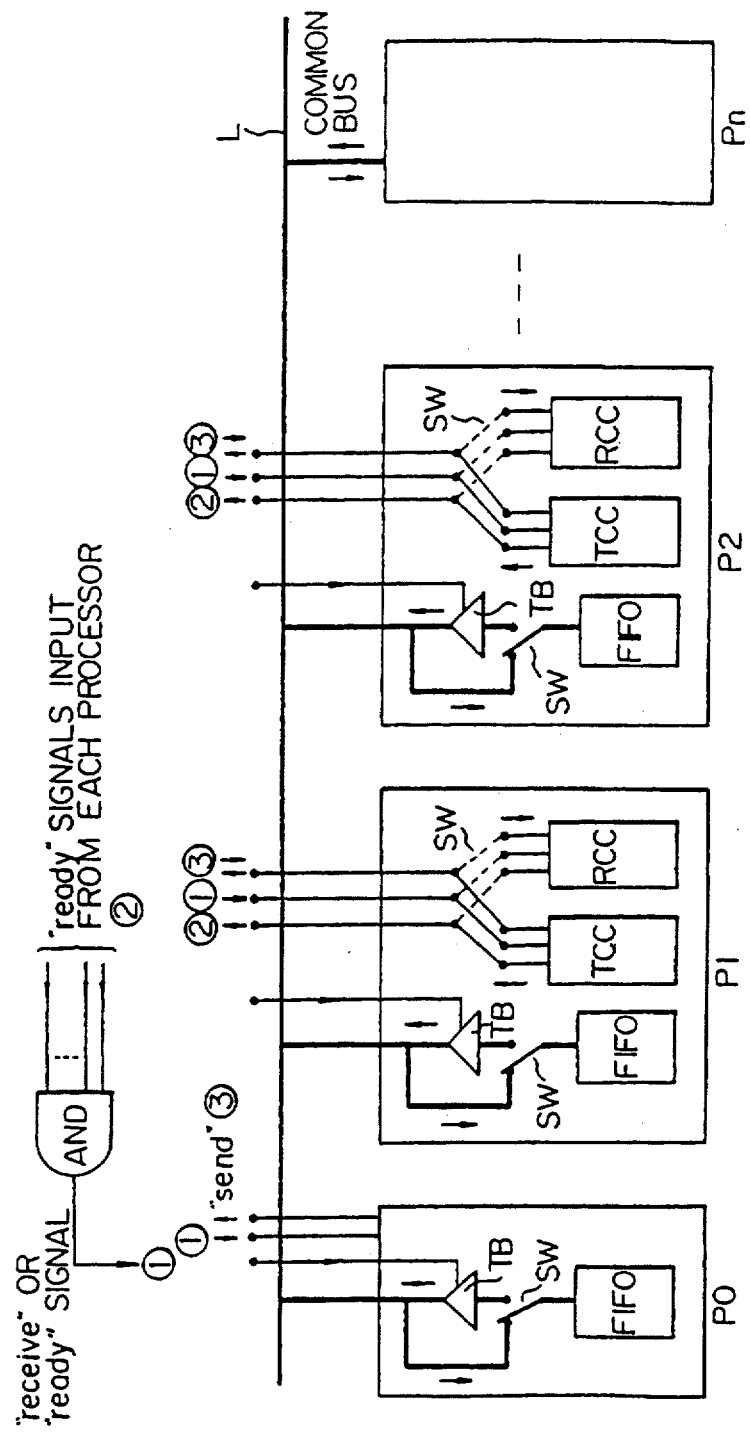
Figure 7:
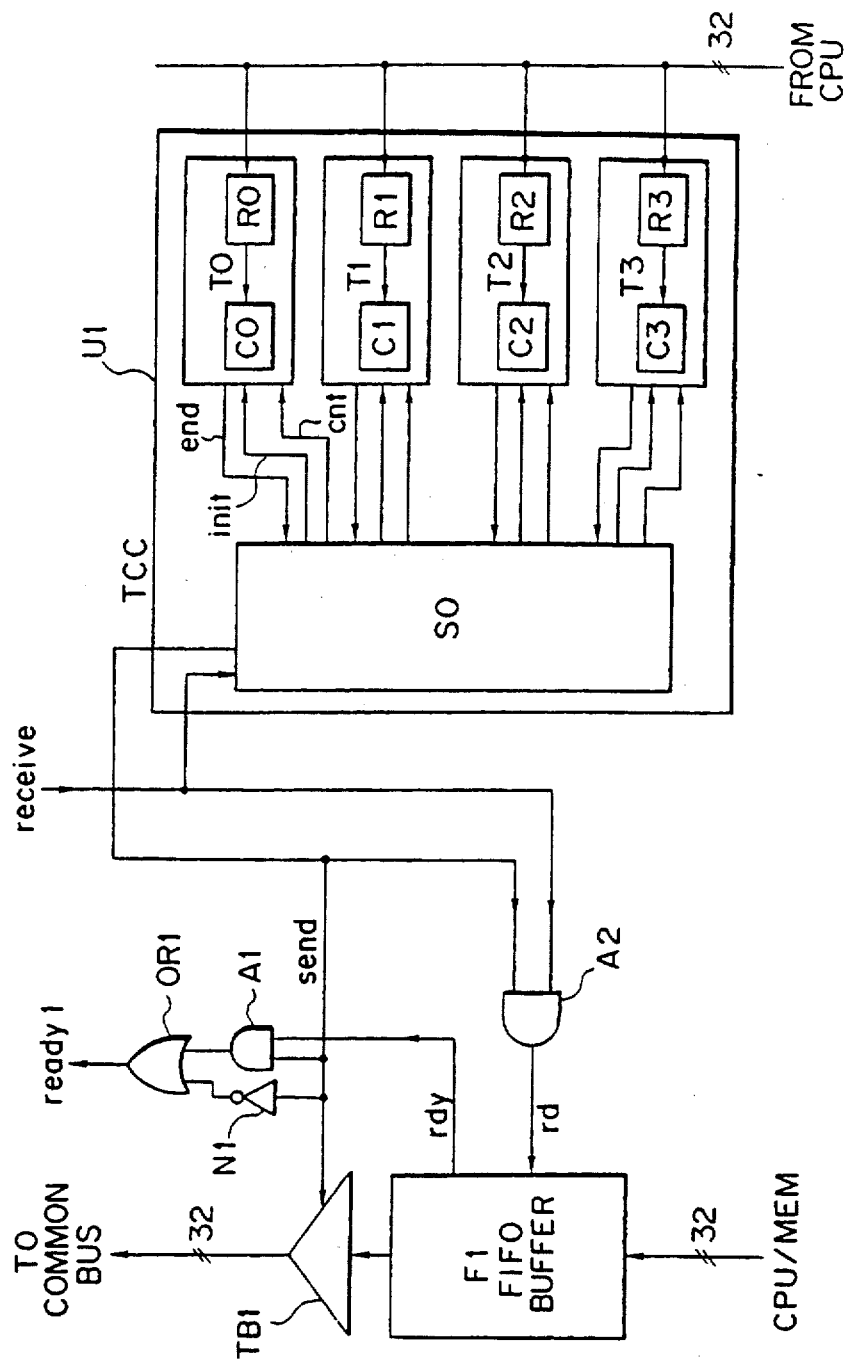
Figure 10:
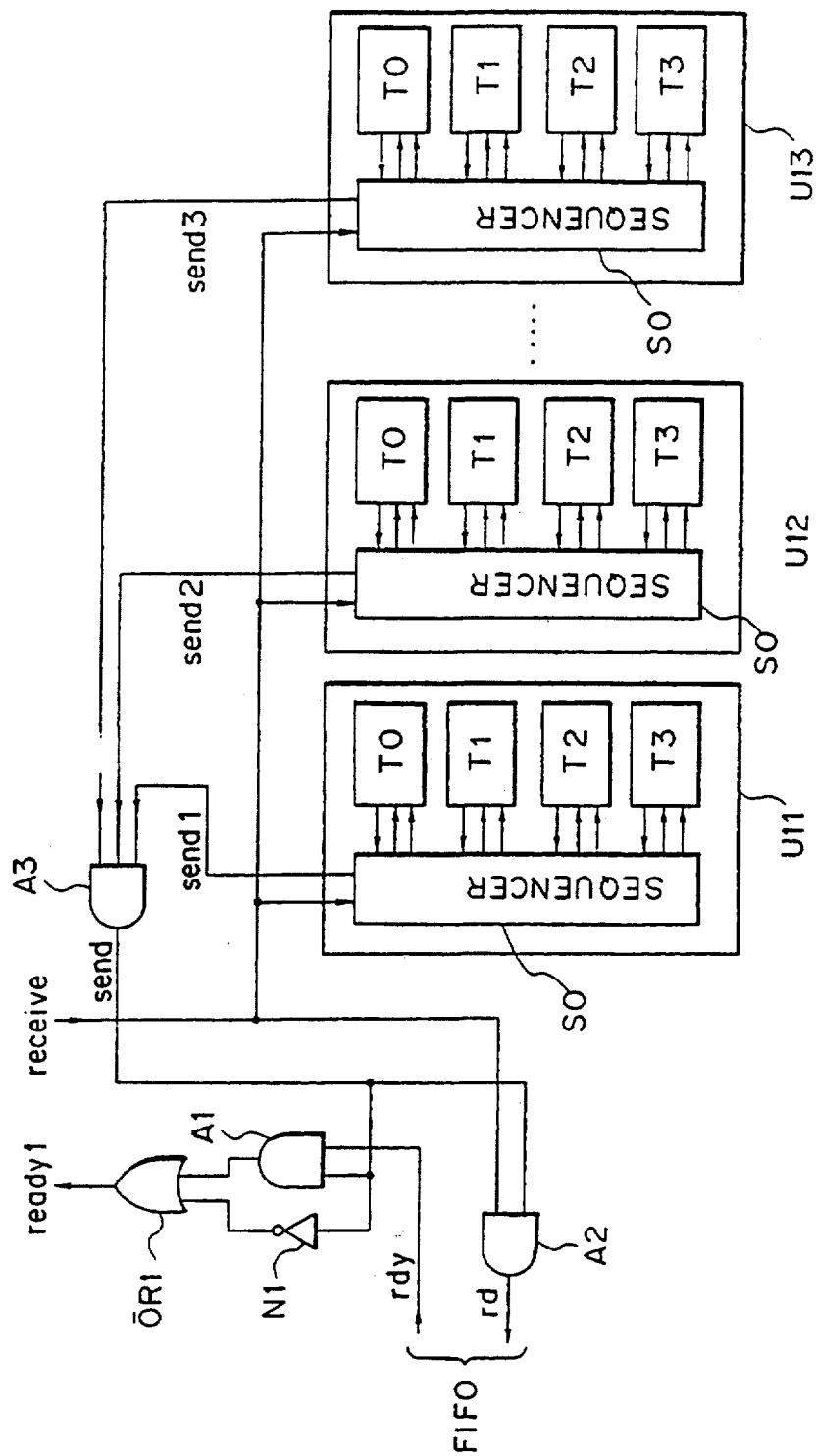

FIG. 39 is a detailed circuit diagram of another example of the reception processor; this has the same structure as that of the data gathering system shown in FIG. 10. For example, in the data shown in FIG. 33, the reception data is indicated by slant lines, and the reception control circuit R01 controls the counting operation of the data for the "y" direction, and the reception control circuit R02 controls the counting operation of the data of the "x" direction. Other reception control circuits are set to the reception enable state (i.e., get n="1"). When the reception control circuits R01 and R02 are set to the reception enable state, since the "get 1" and "get 2" signals are "1" and the "get n" also is "1", and thus the output becomes "1", the output of the AND circuit A3 and the "send" signal are input to the AND circuit A2 and the write signal "wr" is output to reception buffer.

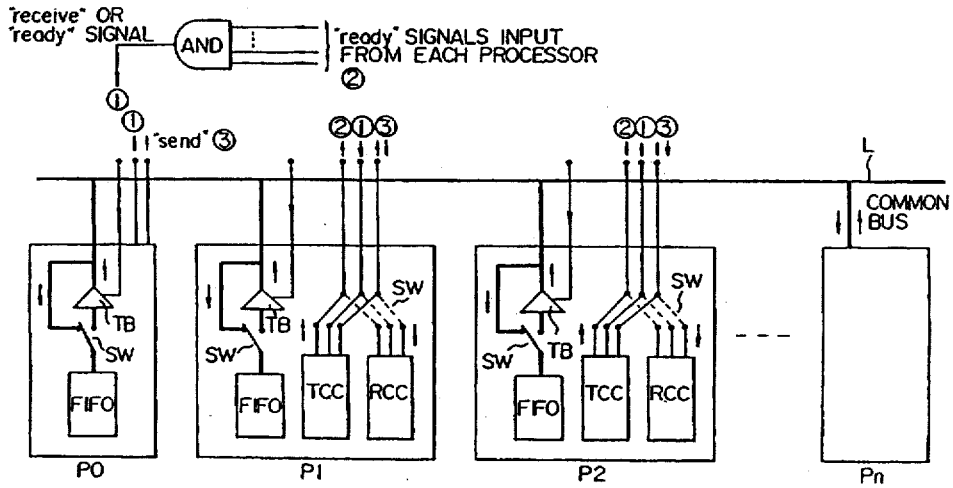

We claim:

1. A data gathering system in a parallel computer, said data gathering system comprising:

a common bus;

a plurality of processors connected in parallel through said common bus, one of said plurality of processors being a reception processor which comprises a reception buffer for temporarily storing data gathered from other of said processors, and said other processors of said plurality of processors being transmitting processors, each respective transmitting processor comprising:

a transmission buffer for temporarily storing the data to be transferred, and transfer control means for controlling data transmission from the transmission buffer to said common bus by checking a number of the data on said common bus, for sending a ready signal when ready to transfer the data and for determining an order of transfer by the respective transmitting processor of said plurality of transmitting processors; and AND means for receiving the ready signals from said plurality of processors and for outputting a reception signal to said plurality of processors.

2. A data gathering system as claimed in claim 1, wherein said one processor of said processors includes memory means for storing the order of transfer, and wherein each of said transfer control means includes means for intermittently transferring data in accordance with the order of transfer stored in said memory means.

3. A data gathering system as claimed in claim 1, wherein:

each of said transfer control means includes means for providing a transfer request signal, and the data gathering system further comprises collision preventing means connected to said common bus for preventing a collision which occurs when said plurality of processors simultaneously transmit data on said common bus and for receiving the transfer request signals before said plurality of processors transmit the data to detect a competition among the transfer request signals and for controlling the order of transfer said plurality of processors.

4. A data gathering system as claimed in claim 1, wherein each of transfer control means includes means for outputting a hand-shake signal, when one transmitting processor of said plurality of transmitting processors are not in the order of transfer, to said reception processors and for transmitting the data to said common bus after receiving the reception signal from an AND operation among all hand-shake signals performed by said AND means.

5. A data gathering system as claimed in claim 1, wherein each of said transfer control means comprises:

a sequencer; and four count control circuits each connected to said sequencer, each count control circuit of said count control circuits comprising:

a counter for counting numbers of words; and a register for prestoring the numbers of words to be counted.

6. A data gathering system in a parallel computer, said data gathering system comprising:

hierarchical common busses; and a plurality of processors connected in parallel through said hierarchical common buses, one processor of said plurality of processors being a reception processor which comprises:

a reception buffer for temporarily storing data gathered from other processors of said processors; and a plurality of mediating means, each of said mediating means being connected to each of said hierarchical common buses, for determining a direction of a transfer of data; and said other processors of said plurality of processors are transmitting processors, each respectively comprising:

a transmission buffer for temporarily storing data to be transferred; and transfer control means for controlling data transfer from said transmission buffer to said hierarchical common buses by checking a number of said data on said hierarchical common buses and determining an order of transfer by one transmitting processor of said plurality of transmitting processors.

7. A data gathering system as claimed in claim 6, wherein said one processor of said processors includes memory means for storing the order of transfer, and wherein each of said transfer control means includes means for intermittently transferring data in accordance with the order of transfer stored in said memory means.

8. A data gathering system as claimed in claim 6, wherein:

each of said transfer control means includes means for providing a transfer request signal, and the data gathering system further comprises collision preventing means connected to said hierarchical common buses for preventing a collision which occurs when said plurality of processors simultaneously transmit data on said hierarchical common buses and for receiving the transfer request signals before said plurality of processors transmit the data to detect a competition among the transfer request signals and for controlling the order of transfer of said plurality of processors.

9. A data gathering system as claimed in claim 6, wherein each of said transfer control means includes means for outputting a hand-shake signal, and wherein an own processor is not in the order of transfer, to said other processor of said plurality of processors and for transmitting the data to said hierarchical common buses after receiving the reception signal from an AND operation among all hand-shake signals performed by said AND means.

10. A data scattering system in a parallel computer, said data scattering system comprising:

hierarchical common buses; and a plurality of processors connected in parallel through said hierarchical common buses, one of said plurality of processors being a transmitting processor which comprises a transmission buffer for temporarily storing data to be transferred to other processors of said processors and for sequentially transmitting the data to said hierarchical common buses by a broadcasting method, and said other processors of said processors being reception processors, each reception processor comprising:
   a reception buffer for temporarily storing data to be received, and
   reception control means for selecting some of the data to be received from among all of the data on said hierarchical common buses, in accordance with a predetermined reception count and for providing a ready signal when ready to receive data; and AND means for receiving the ready signals from said reception processors and for outputting a send signal to said reception processors, prior to the data transmission.

11. A data scattering system as claimed in claim 10, wherein said reception control means includes:
   a sequencer; and
   four count control circuits each connected to said sequencer, each of said count control circuits having:
      a counter for counting numbers of words; and
      a register for prestoring the numbers of words to be counted.

12. A data gathering/scattering system having a data gathering system and a data scattering system in a parallel computer, said data gathering/scattering system comprising:
   a common bus;
   a plurality of processors connected in parallel by said common bus,
      one of said processors being a transmitting processor comprising:
         a buffer for temporarily storing data gathered from or transmitted to other processors of said plurality of processors,
         a three-state buffer for transmitting data from the buffer to said common bus, and
         switching means for switching a connection between a transmission and a reception to form one of the data gathering system and the data scattering system; and
      each of said other processors of said plurality of processors being reception processors, each reception processor comprising:
         a buffer for temporarily storing data to be transferred or data to be received,
         transfer control means for controlling data transmissions from said buffer to said common bus,
         reception control means for selecting reception data from among all of the data on said common bus,
         a three-state buffer for transmitting the data from said buffer to said common bus, and
         switching means for switching a connection between a transmission and a reception to form the data gathering system or the data scattering system, respectively; and
   AND means for obtaining a coincidence of data transmissions or data receptions among said plurality of processors and for commanding a data transmission or data reception to said others of said processors.

13. A data gathering/scattering system having a data gathering system and a data scattering system in a parallel computer, said data gathering/scattering system comprising:
   hierarchical common buses;
   a plurality of processors connected in parallel by said hierarchical common bus,
      one of said plurality of processors comprises:
         a buffer for temporarily storing data gathered from or transmitted to other processors of said plurality of processors,
         a three-state buffer for transmitting data from the buffer to said hierarchical common buses, and
         switching means for switching a connection between a transmission and a reception to form one of the data gathering system and the data scattering system;
      said other processors of said plurality of processors each comprises:
         a buffer for temporarily storing data to be transferred or data to be received,
         transfer control means for controlling data transmission from said buffer to said hierarchical common buses,
         reception control means for selecting reception data from among all of the data on said hierarchical common buses,
         a three-state buffer for transmitting the data from said buffer to said hierarchical common buses, and
         switching means for switching a connection between a transmission and reception to form the data gathering system; and
   AND means for obtaining a coincidence of data transmissions or data receptions among said processors and for commanding a data transmission or data reception to said other processors.

* * * * *

UNITED STATES PATENT AND TRADEMARK OFFICE
CERTIFICATE OF CORRECTION

PATENT NO. : 5,832,215
DATED : Nov. 3, 1998
INVENTOR(S) : Sadayuki KATO et al.

It is certified that error appears in the above-identified patent and that said Letters Patent is hereby corrected as shown below:

The title page should be deleted to appear as per attached title page.

Please delete drawing sheets 1,2,3,7 & 5 and substitute drawing sheets 1,2,3, 7 & 5 as per attached.

Signed and Sealed this

Thirteenth Day of July, 1999

Attest:

Attesting Officer

Q. TODD DICKINSON

Acting Commissioner of Patents and Trademarks

United States Patent
Kato et al.

Patent Number: 5,832,215
Date of Patent: Nov. 3, 1998

[54] DATA GATHERING/SCATTERING SYSTEM FOR A PLURALITY OF PROCESSORS IN A PARALLEL COMPUTER

[75] Inventors: Sadayuki Kato, Kawasaki; Hiroaki Ishihata, Tokyo; Takeshi Horie; Satoshi Inano, both of Kawasaki; Toshiyuki Shimizu, Yokohama, all of Japan

[73] Assignee: Fujitsu Limited, Kawasaki, Japan

[21] Appl. No.: 727,932

[22] Filed: Jul. 10, 1991

[30] Foreign Application Priority Data

Jul. 10, 1990 [JP] Japan .................. 2-182073
Jul. 10, 1990 [JP] Japan .................. 2-182075

[51] Int. Cl.$^6$ .................................. G06F 15/163
[52] U.S. Cl. .................. 395/200.6; 364/229.2; 364/260.2; 364/DIG. 1
[58] Field of Search ................ 395/800, 325, 395/725, 200, 200.6, 800.01; 370/94.1, 85.6; 364/229.2, 260.2, DIG. 1

[56] References Cited

U.S. PATENT DOCUMENTS

| | | | |
|---|---|---|---|
| 3,611,307 | 10/1971 | Podvin | 395/725 |
| 4,228,496 | 10/1980 | Katzman et al. | 395/200 |
| 4,467,418 | 8/1984 | QuinQuis | 395/325 |
| 4,654,654 | 3/1987 | Butler et al. | 340/825.5 |
| 4,750,114 | 6/1988 | Hirtle | 395/250 |
| 4,888,684 | 12/1989 | Lilja et al. | 395/325 |
| 4,914,653 | 4/1990 | Bishop et al. | 370/85.6 |
| 5,010,477 | 4/1991 | Omoda et al. | 395/800 |
| 5,086,498 | 2/1992 | Tanaka et al. | 395/200 |

*Primary Examiner*—Alyssa H. Bowler
*Assistant Examiner*—John E. Harrity
*Attorney, Agent, or Firm*—Staas & Halsey

[57] ABSTRACT

In a data gathering/scattering system having a data gathering system and a data scattering system in a parallel computer constituted by a plurality of processors connected in parallel through a common bus or hierarchical common buses, the data gathering/scattering system includes: one processor having a buffer for temporarily storing data gathered from or transmitted to other processors, a three-state buffer for transmitting data from the buffer to the common bus, and a switching unit for switching a connection between a transmission and a reception to form the data gathering system or the data scattering system; each of the other processors having a buffer for temporarily storing data to be transferred or data to be received, a transfer control unit for controlling data transmissions from the buffer to the common bus, a reception control unit for selecting the reception data from among all data on the common bus, a three-state buffer for transmitting data from the buffer to the common bus, and a switching unit for switching a connection between a transmission and a reception to form the data gathering system or the data scattering system, and an AND circuit for obtaining a coincidence of a data transmission or data reception among the processors, and for sending a command for a data transmission or data reception to other processors.

13 Claims, 32 Drawing Sheets